US008885266B2

United States Patent
Uno et al.

(10) Patent No.: US 8,885,266 B2
(45) Date of Patent: Nov. 11, 2014

(54) LENS BARREL

(71) Applicant: Panasonic Corporation, Kadoma (JP)

(72) Inventors: Tetsuya Uno, Osaka (JP); Hiroyasu Fujinaka, Osaka (JP); Wataru Yamazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/949,131

(22) Filed: Jul. 23, 2013

(65) Prior Publication Data

US 2013/0308202 A1    Nov. 21, 2013

Related U.S. Application Data

(63) Continuation-in-part of application No. PCT/JP2012/000388, filed on Jan. 23, 2012.

(30) Foreign Application Priority Data

Jan. 24, 2011    (JP) .................................. 2011-012418

(51) Int. Cl.
*G02B 15/14*    (2006.01)
*G02B 27/02*    (2006.01)

(52) U.S. Cl.
USPC .......................................... 359/699; 359/804

(58) Field of Classification Search
USPC .................................. 359/694–704, 811–830
See application file for complete search history.

(56) References Cited

U.S. PATENT DOCUMENTS

| | | | |
|---|---|---|---|
| 5,136,315 A | 8/1992 | Nomura | |
| 6,035,136 A | 3/2000 | Hayashi et al. | |
| 6,443,636 B1 | 9/2002 | Iwasa | |
| 6,501,909 B1 | 12/2002 | Nishimura et al. | |
| 7,039,308 B2 | 5/2006 | Nomura | |
| 7,561,353 B2 | 7/2009 | Shirakata | |
| 7,742,237 B2 | 6/2010 | Nomura et al. | |
| 7,746,584 B2* | 6/2010 | Honsho et al. | ............ 359/826 |
| 7,920,345 B2* | 4/2011 | Honsho et al. | ............ 359/826 |
| 8,016,497 B2 | 9/2011 | Murakami | |
| 8,068,294 B2 | 11/2011 | Nagaoka et al. | |

(Continued)

FOREIGN PATENT DOCUMENTS

| | | |
|---|---|---|
| JP | S60-135711 U | 9/1985 |
| JP | S63-068619 U | 5/1988 |

(Continued)

OTHER PUBLICATIONS

International Search Report for an International Application No. PCT/JP2012/000381 mailed Feb. 14, 2012.

(Continued)

*Primary Examiner* — Mohammed Hasan
(74) *Attorney, Agent, or Firm* — Shinjyu Global IP

(57) ABSTRACT

A lens barrel comprises a first frame, a barrier mechanism, and a second frame. The barrier mechanism is fixed to the first frame and blocks an opening. The second frame uses a cam mechanism to guide the first frame in the optical axis direction. The second frame has a cylindrical cam mechanism part that constitutes a cam mechanism. The cam mechanism part is provided with a thin-wall part that is partially thinner in the radial direction. A fixing portion of the barrier mechanism goes into spaces between the thin-wall part and the first frame.

1 Claim, 25 Drawing Sheets

(56) References Cited

U.S. PATENT DOCUMENTS

| | | |
|---|---|---|
| 8,218,251 B2 | 7/2012 | Nagae |
| 8,351,775 B2 | 1/2013 | Nagae |
| 8,526,122 B2 | 9/2013 | Fujinaka et al. |
| 8,547,647 B2 | 10/2013 | Shinano et al. |
| 2004/0042089 A1 | 3/2004 | Nomura |
| 2004/0196573 A1* | 10/2004 | Nomura et al. ............... 359/701 |
| 2007/0091475 A1 | 4/2007 | Shirakata |
| 2009/0323188 A1 | 12/2009 | Nomura et al. |
| 2010/0067896 A1 | 3/2010 | Murakami |
| 2011/0007409 A1 | 1/2011 | Nagae |
| 2011/0013897 A1 | 1/2011 | Nagae |

FOREIGN PATENT DOCUMENTS

| | | |
|---|---|---|
| JP | H04-018828 U | 2/1992 |
| JP | H04-018828 U1 | 2/1992 |
| JP | H08-190040 A | 7/1996 |
| JP | H11-174305 A | 7/1999 |
| JP | H11-346423 A | 12/1999 |
| JP | 2000-066078 A | 3/2000 |
| JP | 2001-174896 A | 6/2001 |
| JP | 2003-315892 A | 11/2003 |
| JP | 2004-085932 A | 3/2004 |
| JP | 2004-258634 A | 9/2004 |
| JP | 2005-221889 A | 8/2005 |
| JP | 2005-265992 A | 9/2005 |
| JP | 2006-065138 A | 3/2006 |
| JP | 2006-178095 A | 7/2006 |
| JP | 2007-114528 A | 5/2007 |
| JP | 2007-219304 A | 8/2007 |
| JP | 2008-046200 A | 2/2008 |
| JP | 2008-102531 A | 5/2008 |
| JP | 2008-158257 A | 7/2008 |
| JP | 2009-198625 A | 9/2009 |
| JP | 2010-008746 A | 1/2010 |
| JP | 2010-072060 A | 4/2010 |
| JP | 2010-169816 A | 8/2010 |
| JP | 2010-250175 A | 11/2010 |
| JP | 2011-017803 A | 1/2011 |
| JP | 2011-022234 A | 2/2011 |

OTHER PUBLICATIONS

International Search Report for an International Application No. PCT/JP2012/000378 mailed Feb. 14, 2012.

International Search Report for an International Application No. PCT/JP2012/000387 mailed Feb. 14, 2012.

International Search Report for an International Application No. PCT/JP2012/000388 mailed Feb. 21, 2012.

The Office Action from related U.S. Appl. No. 13/949,119 issued on May 19, 2014.

Office Action from the corresponding Japanese Patent Application No. 2012-554672 issued on Jul. 22, 2014.

Office Action from related Japanese Patent Application No. 2012-554671 issued on Sep. 2, 2014.

Office Action from related Japanese Patent Application No. 2012-554666 issued on Sep. 2, 2014.

Office Action from related Japanese Patent Application No. 2012-554669 issued on Sep. 16, 2014.

* cited by examiner

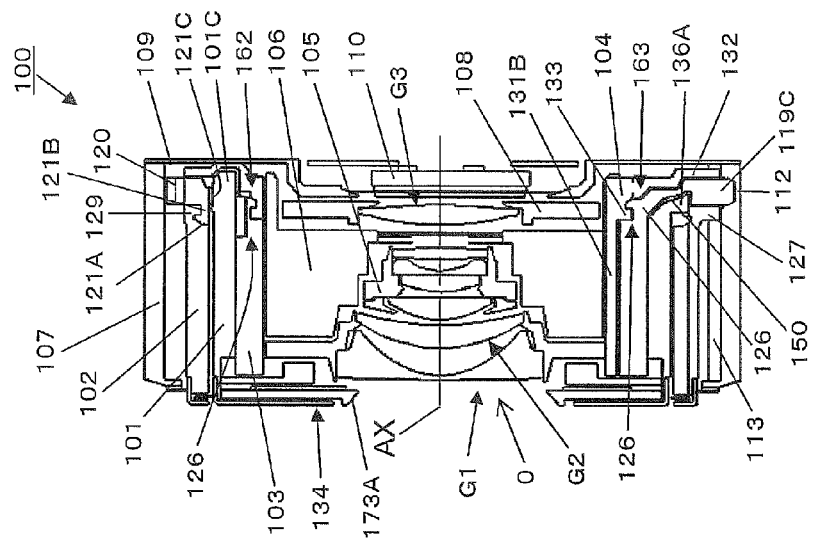
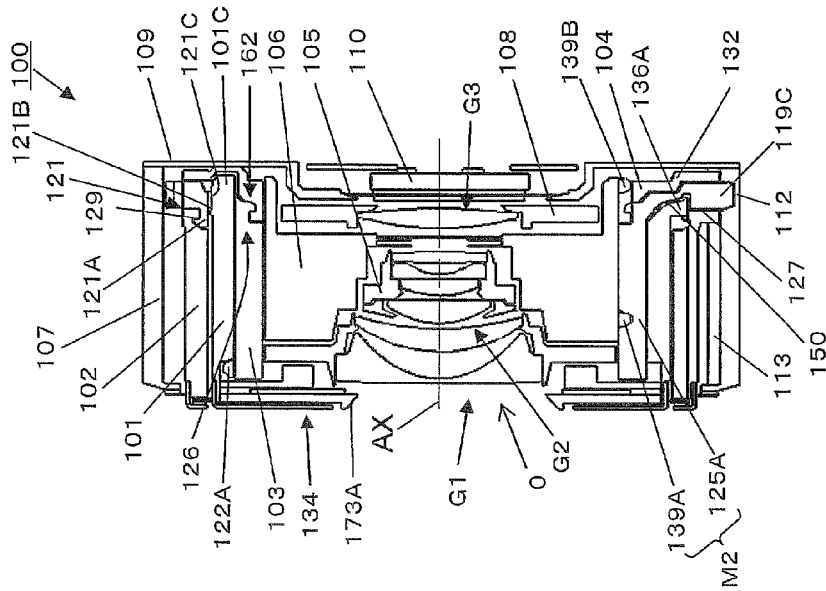

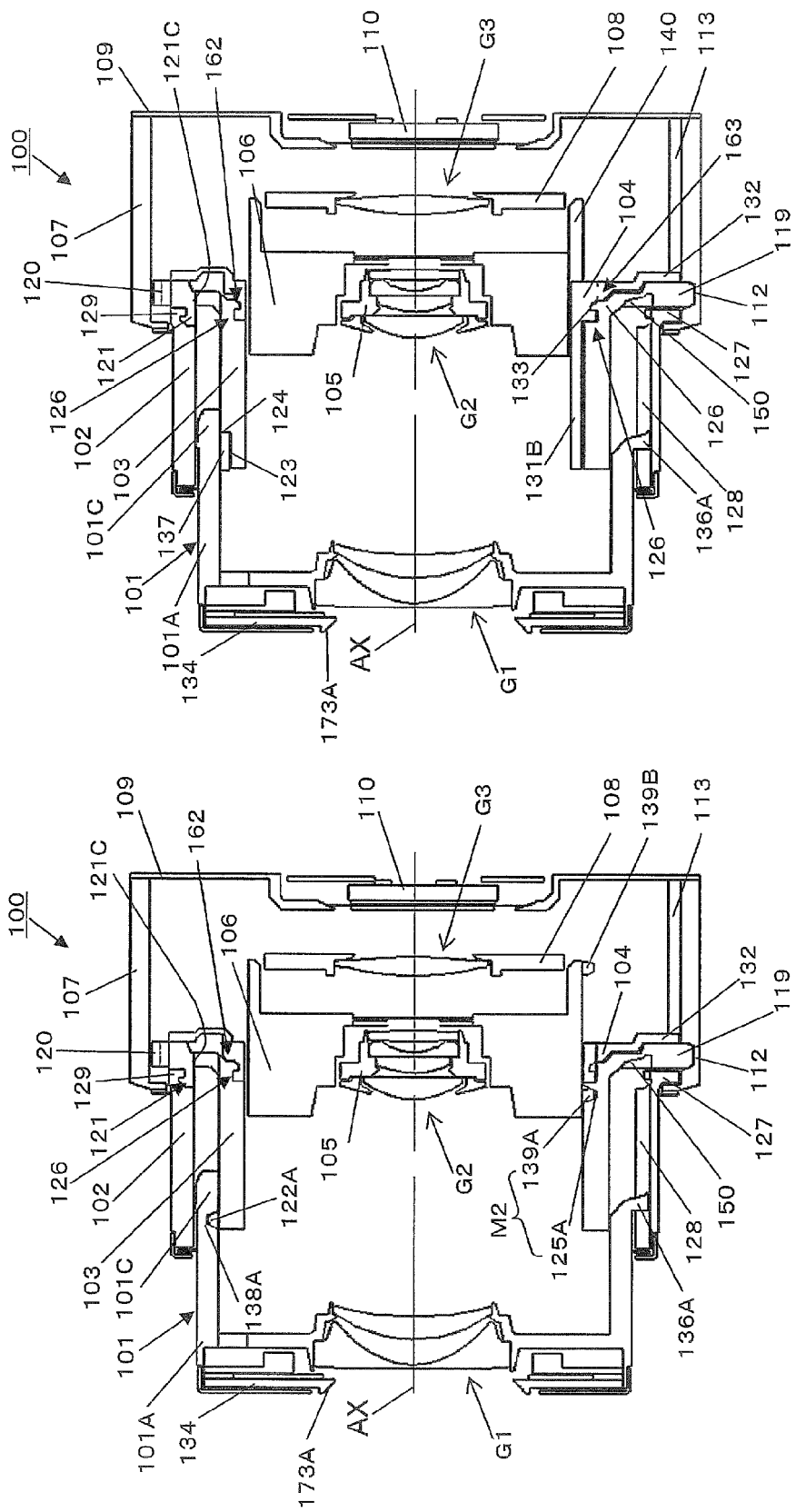

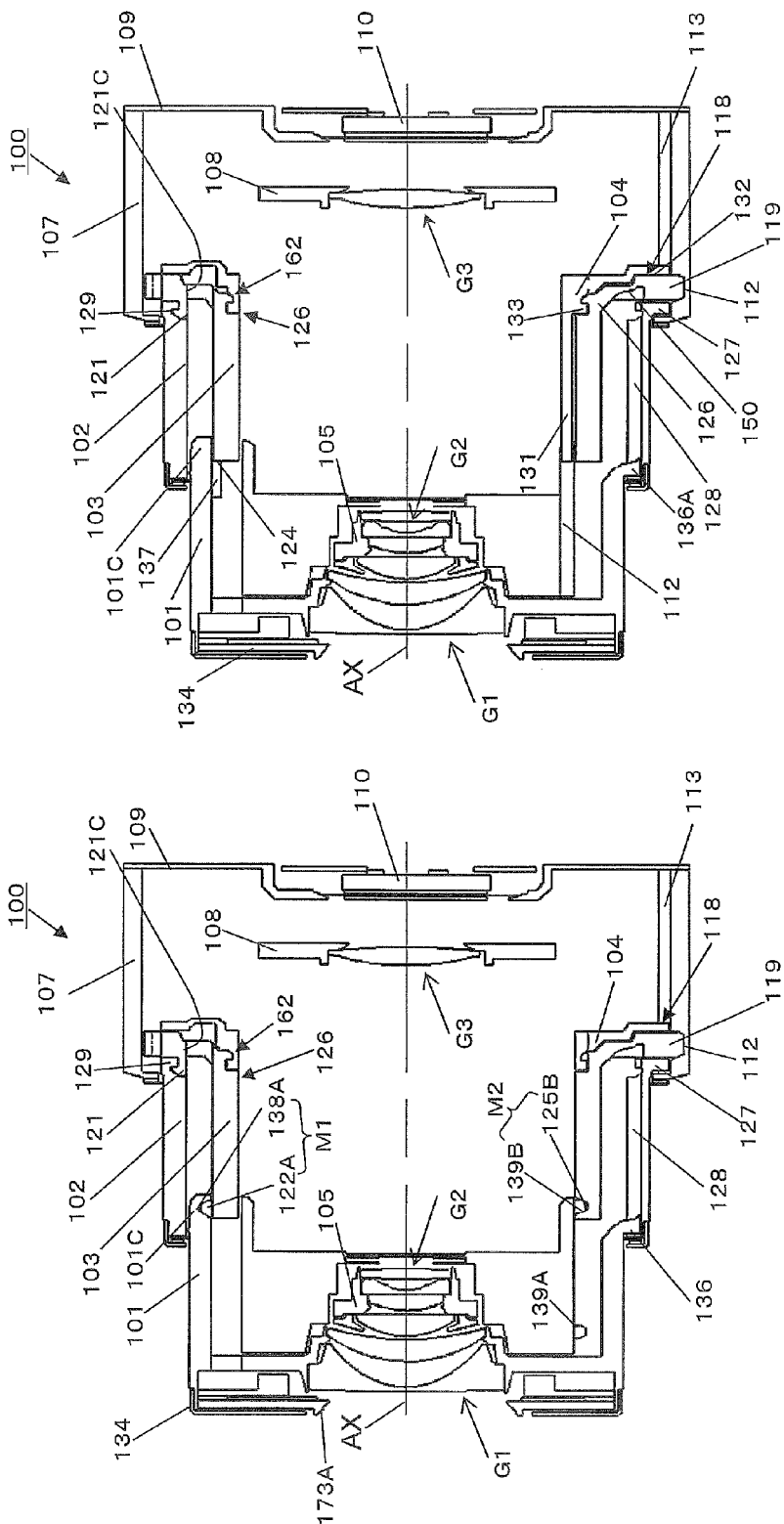

(A) arrow view 1

(B) arrow view 2

(A) when retracted (B) partly deployed (A) when retracted (B) partly deployed

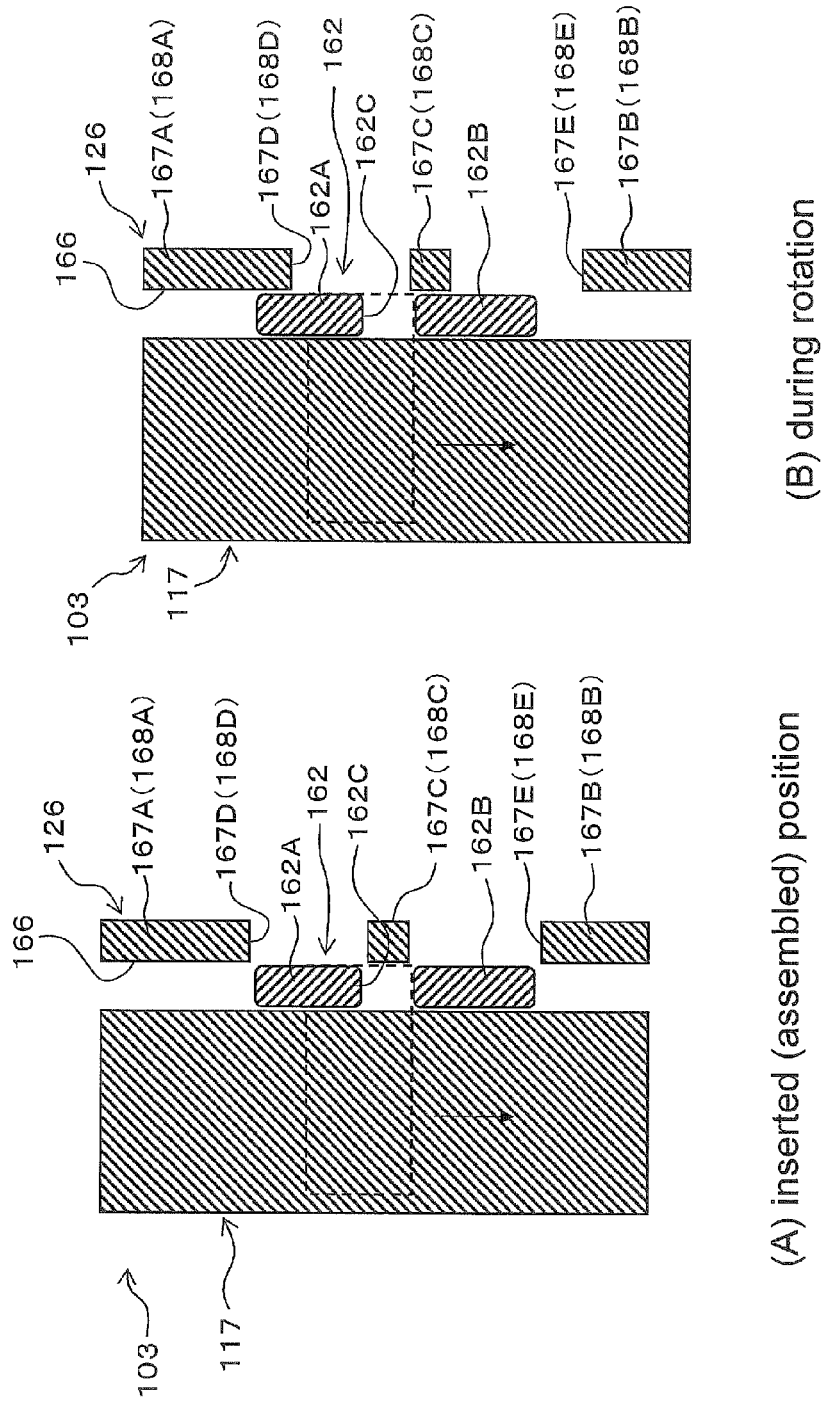

US 8,885,266 B2

LENS BARREL

CROSS-REFERENCE TO RELATED APPLICATIONS

This application is a continuation of PCT Application No. PCT/JP2012/000388 filed Jan. 23, 2012, which claims priority to Japanese Patent Application No. 2011-012418 filed on Jan. 24, 2011. The entire disclosures of PCT Application No. PCT/JP2012/000388 and Japanese Patent Application No. 2011-012418 are hereby incorporated herein by reference.

BACKGROUND

1. Technical Field

The technology disclosed herein relates to a lens barrel that supports an optical system.

2. Background Information

There are known lens barrels that support an optical system with which the focal distance can be varied. For example, the lens barrel disclosed in Japanese Laid-Open Patent Application 2007-219304 comprises a first moving cam ring in which a cam groove is formed, and a first group lens barrel that supports a first lens group. The first group lens barrel has a follower pin that engages in the cam groove. With this lens barrel, the first moving cam ring and the first group lens barrel allow the first lens group to be moved in the optical axis direction with respect to the first moving cam ring.

With this type of lens barrel, a barrier unit is fixed on the subject side of a support frame. For example, the barrier unit is fixed to the support frame by fixing members.

If the support frame and another frame are disposed close together in order to make the product more compact, there is the risk that the fixed portions between the barrier unit and the support frame will interfere with the other frame. If an attempt is made to prevent this interference, the other frame has to be stopped at a position where it will not interfere with the above-mentioned fixed portions when the two frames (the support frame and the other frame) are moved relatively in the optical axis direction. In this case, it is difficult to reduce the minimum combined length of the two frames in the optical axis direction. Specifically, this hampers efforts at making the lens barrel more compact.

It is an object of the technology disclosed herein to provide a lens barrel that can be made more compact.

SUMMARY

The lens barrel disclosed herein comprises a first frame, a barrier mechanism, and a second frame. The barrier mechanism is fixed to the first frame and configured to block an opening. The second frame is configured to guide the first frame in the optical axis direction by a cam mechanism The second frame includes a cylindrical cam mechanism part that constitutes a cam mechanism. The cam mechanism includes a thin-wall part that is partially thinner in the radial direction. A fixing portion of the barrier mechanism goes into spaces between the thin-wall part and the first frame.

With this lens barrel, since the fixing portion of the barrier mechanism go into the spaces formed between the thin-wall part and the first frame, the fixing portion can be prevented from interfering with the second frame even if the first frame and the second frame should move close together in the optical axis direction. Consequently, with this lens barrel, the minimum length of the first frame and the second frame in the optical axis direction can be reduced, and a more compact size obtained.

With the technology disclosed herein, a lens barrel can be provided with which a more compact size can be obtained.

BRIEF DESCRIPTION OF THE DRAWINGS

Referring now to the attached drawings, which form a part of this original disclosure:

FIG. 8A is a simplified cross section of when the lens barrel is retracted, and FIG. 8B is another simplified cross section of when the lens barrel is retracted;

FIG. 9A is a simplified cross section of when the lens barrel is at the wide angle end, and FIG. 9B is another simplified cross section of when the lens barrel is at the wide angle end;

FIG. 10A is a simplified cross section of when the lens barrel is at the telephoto end, and FIG. 10B is another simplified cross section of when the lens barrel is at the telephoto end;

FIG. 24A illustrates the assembly of the cam frame and the second rectilinear frame in an insertion state, and FIG. 24B illustrates the assembly of the cam frame and the second rectilinear frame in a rotation state.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

<Simplified Configuration of Digital Camera>

Figure 1:
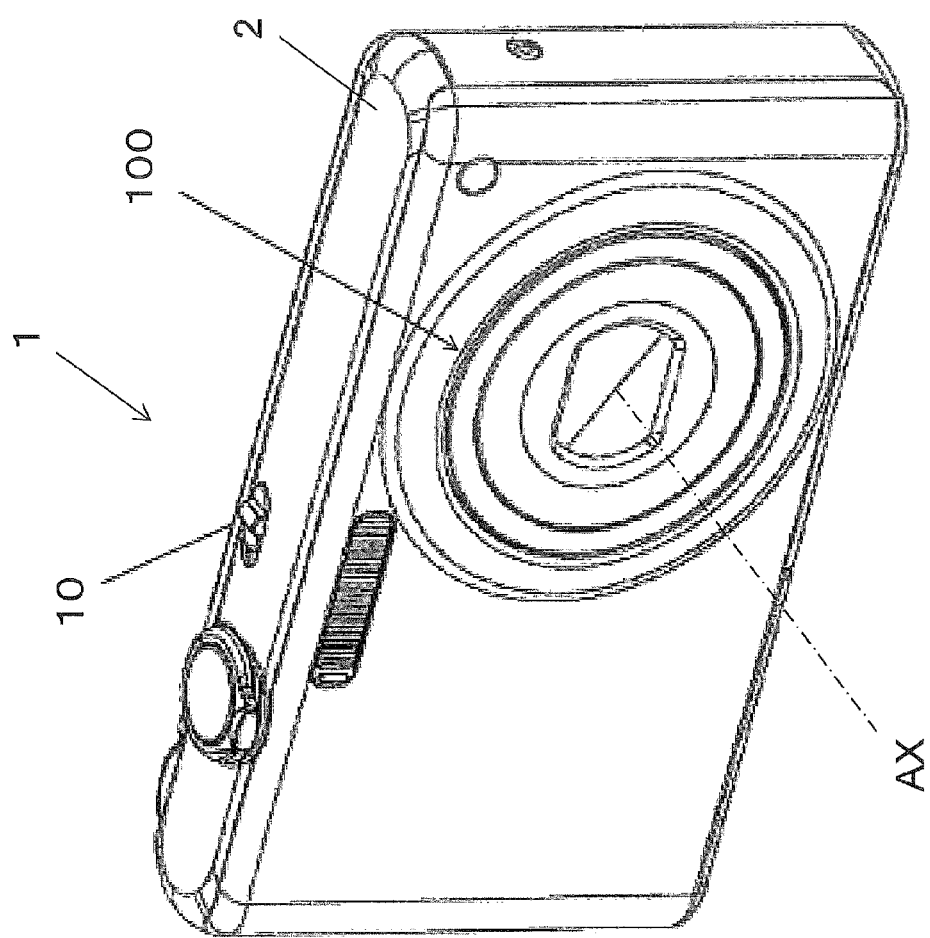
FIG. 1 is an oblique view of a digital camera 1 equipped with a lens barrel.

As shown in FIG. 1, the digital camera 1 comprises a housing 2 and a lens barrel 100 (an example of a lens barrel). When a power switch 10 is used to turn on the power, the lens barrel 100 is deployed from the housing 2 so that imaging is possible.

The digital camera 1 shown in FIG. 1 is an example of an imaging device. The imaging device may be a digital camera or a film camera. Also, the imaging device may be a camera with which the lens barrel 100 can be removed and exchanged. The imaging device may also be a still camera that primarily captures still pictures. Or, the imaging device may be a video camera that primarily captures moving pictures.

For the sake of description, the subject side of the digital camera 1 will hereinafter be defined as the forward or front side, and the user side as the rearward or back side. The vertically upper side when the digital camera 1 is in its landscape orientation will be defined as the top side, and the vertically lower side when the digital camera 1 is in its landscape orientation will be defined as the bottom side. The right side as viewed from the subject side will be defined as the right side, and the left side as viewed from the subject side will be defined as the left side. The "landscape orientation" here is an orientation in which the long-side direction of a CCD image sensor 110 is parallel to the horizontal direction, and the short-side direction of the CCD image sensor 110 is parallel to the vertical direction. Herein, a direction parallel to the optical axis AX of the optical system O will sometimes be called the optical axis direction.

<Overall Configuration of Lens Barrel>

Figure 2:
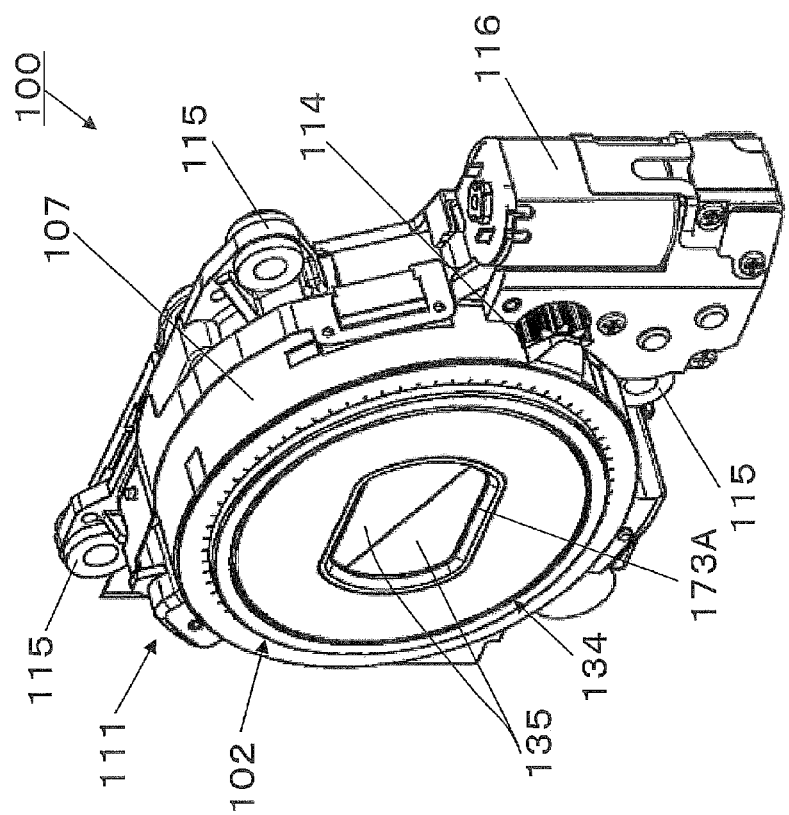
FIG. 2 is an oblique view of when the lens barrel is retracted.
Figure 3:
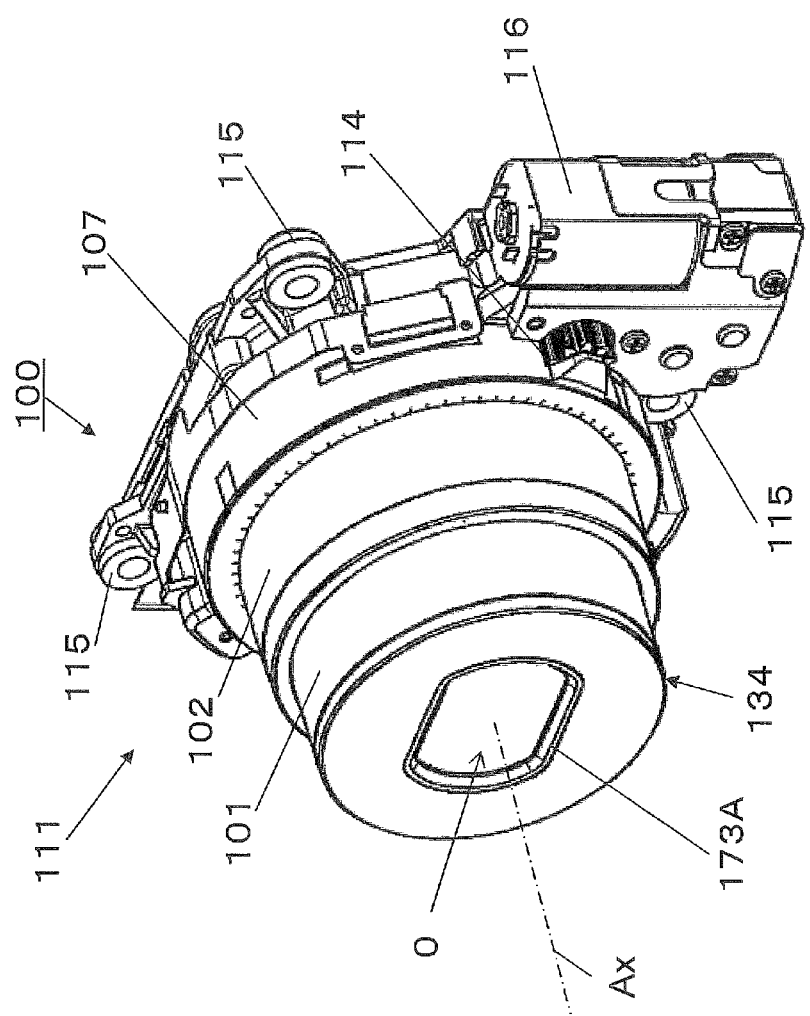
FIG. 3 is an oblique view of when the lens barrel is used for imaging.

As shown in FIGS. 1 and 2, when the power to the digital camera 1 is off, the lens barrel 100 is in its stowed state. In the stowed state, the plurality of frames of the lens barrel 100 are pulled back into the housing 2. In this state, the lens barrel 100 is smaller in size in the optical axis direction. On the other hand, when the power to the digital camera 1 is on, as shown in FIG. 3, the lens barrel 100 is in a state in which imaging is possible (also called an initial imaging state). In the initial imaging state, the plurality of frames of the lens barrel 100 are deployed from the housing 2. In this state, the lens barrel 100 is larger in size in the optical axis direction than in the stowed state.

Figure 4:
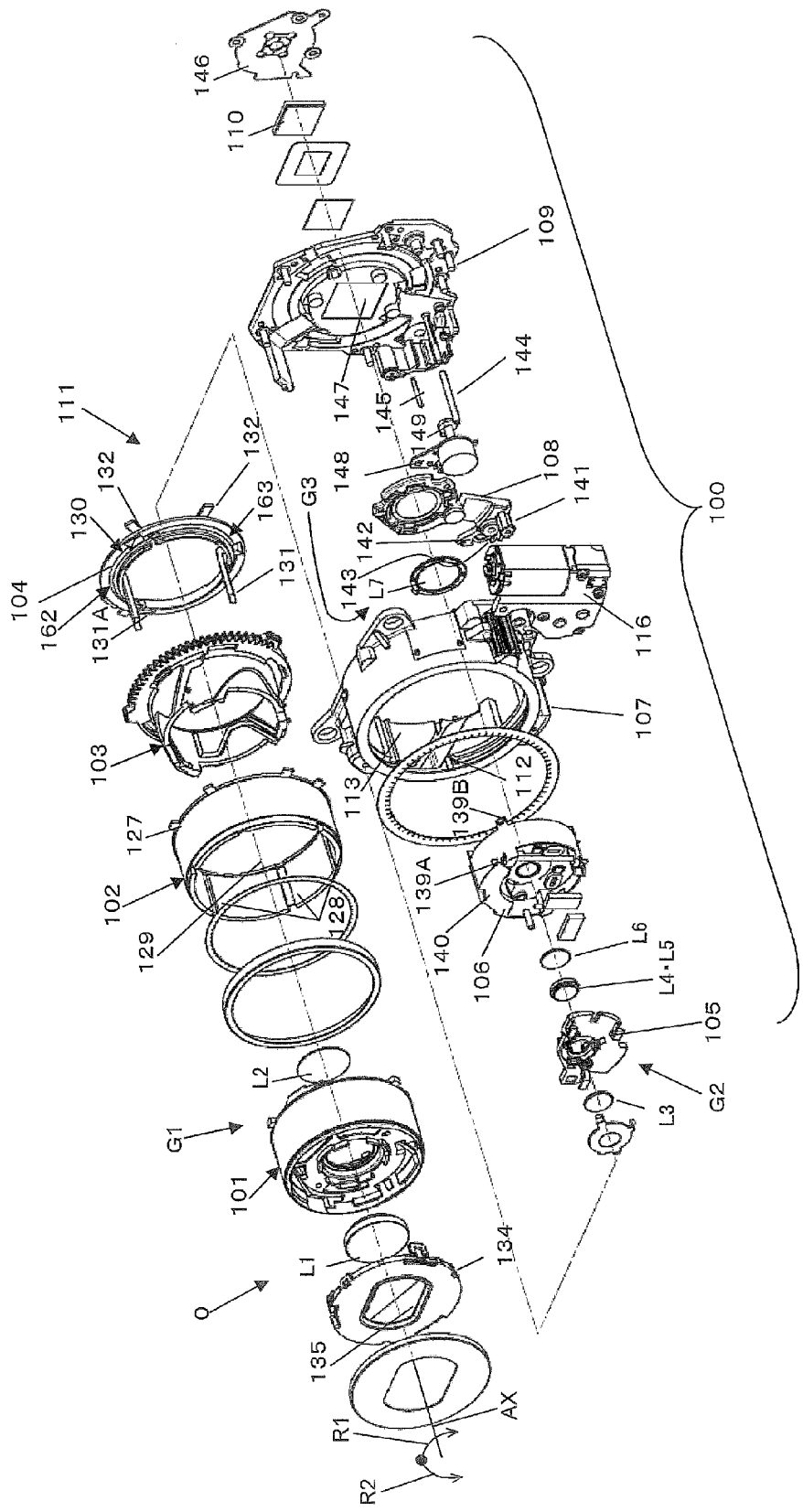
FIG. 4 is an exploded oblique view of a lens barrel.
Figure 5:
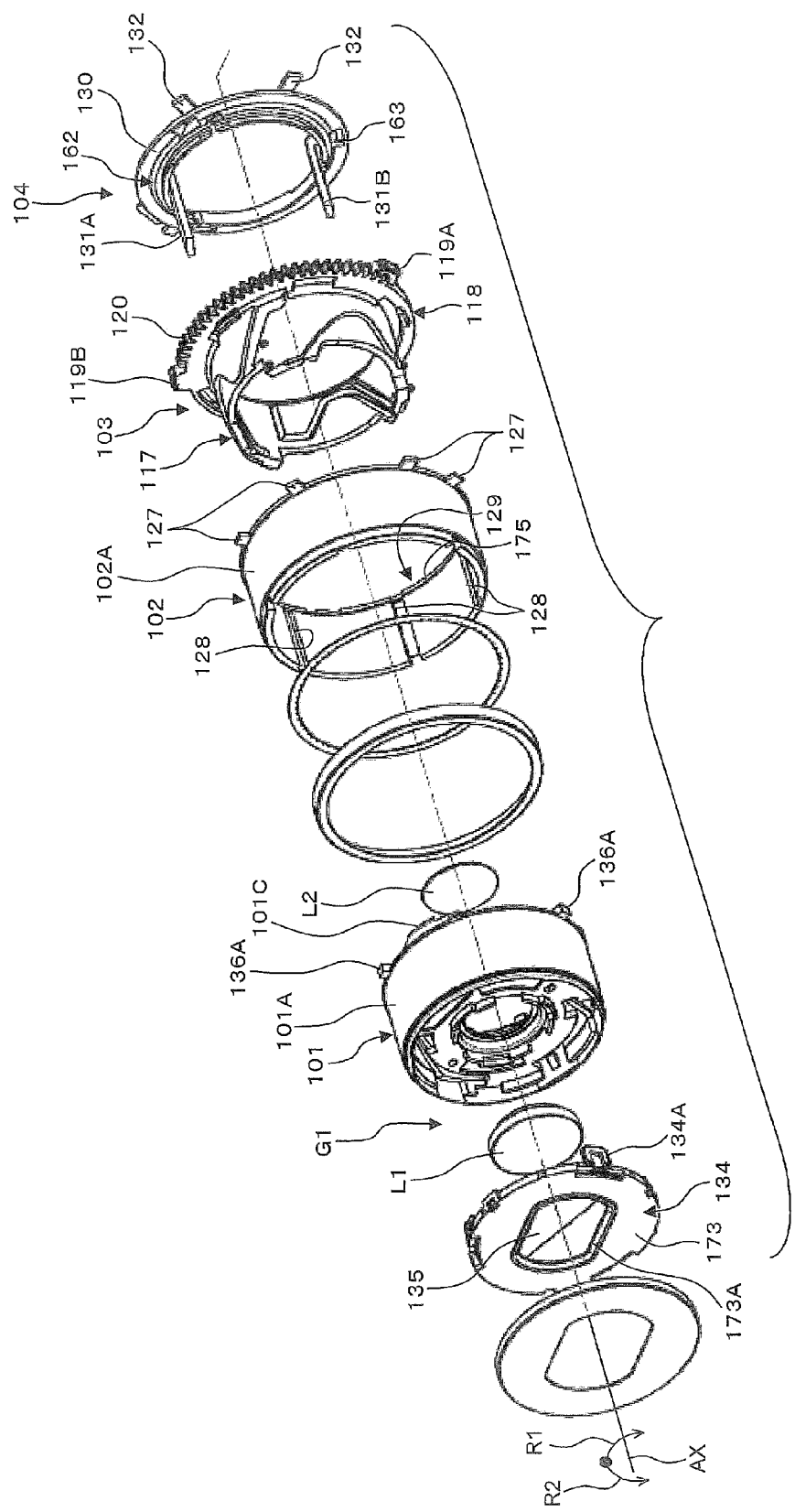
FIG. 5 is a detail enlargement of FIG. 4.
Figure 6:
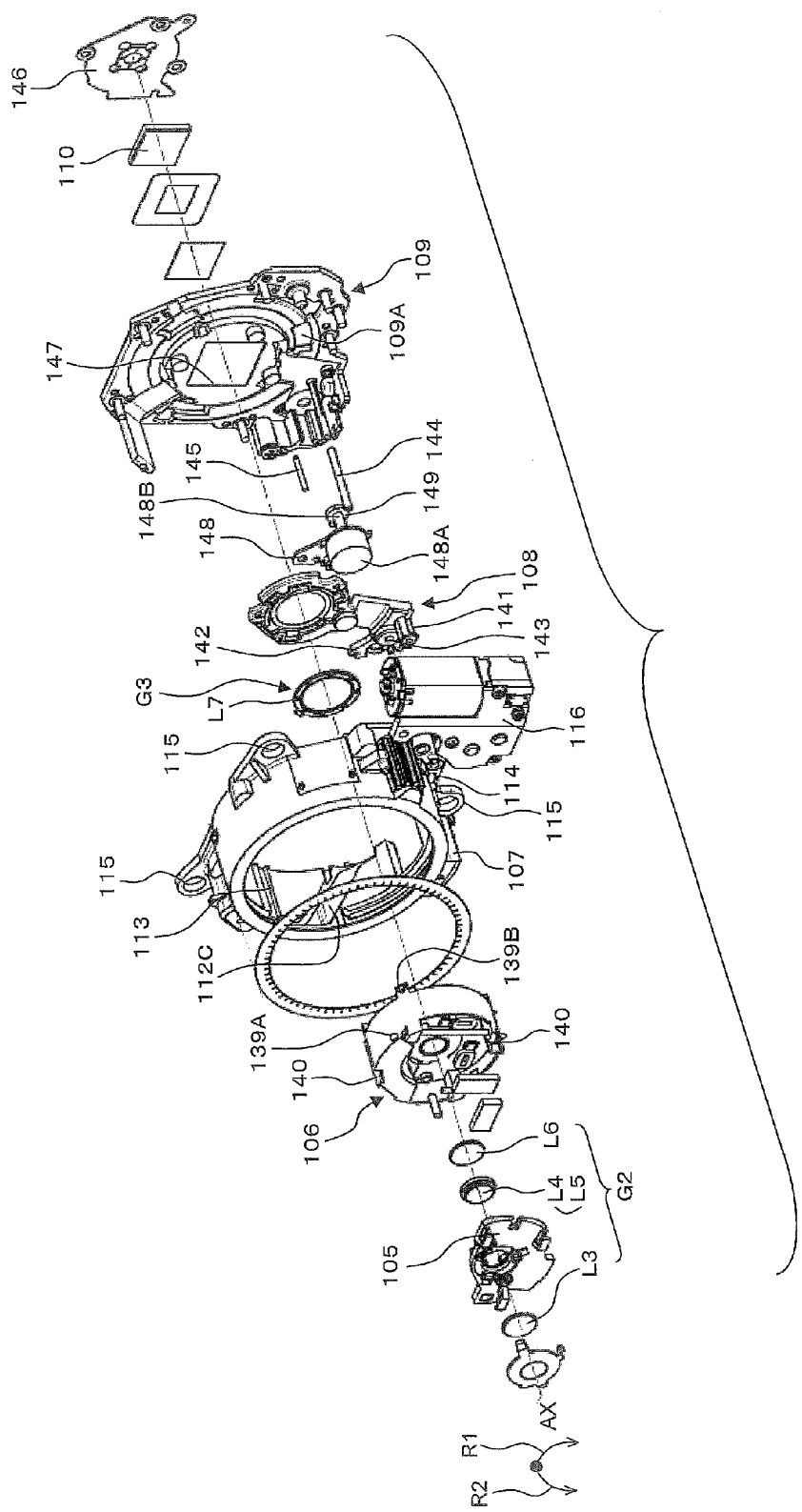
FIG. 6 is a detail enlargement of FIG. 4.

As shown in FIGS. 4 to 6, the lens barrel 100 comprises the optical system O, a lens drive mechanism 111, and the CCD image sensor 110.

The optical system O forms an optical image of a subject on the light receiving face of the CCD image sensor 110. As shown in FIG. 4, the optical system O has a first lens group G1 (an example of a lens element), a second lens group G2, and a third lens group G3. As shown in FIG. 5, the first lens group G1 has a first lens L1 and a second lens L2. The second lens group G2 is a blur correction lens group. As shown in FIG. 6, the second lens group G2 has a third lens L3, a fourth lens L4, a fifth lens L5, and a sixth lens L6. The third lens group G3 has a seventh lens L7 that functions as a focus lens.

The above-mentioned lens barrel 100 drives each of the first lens group G1, the second lens group G2, and the third lens group G3 in the optical axis direction. The lens barrel 100 varies the focal distance of the optical system O by changing the spacing between the first lens group G1 and the second lens group G2 and the spacing between the second lens group G2 and the third lens group G3. Varying the focal distance is called zooming.

The lens barrel 100 varies the imaging distance (also called the subject distance) from the digital camera 1 to the main subject that is in focus, by moving the third lens group G3 in the optical axis direction. Varying the imaging distance is also called focusing. The configuration (number and shape) of the various lenses of the optical system O is not limited to that in this embodiment, and other configurations may be used instead.

The CCD image sensor 110 converts an optical image of a subject into an electrical image signal. The CCD image sensor 110 is fixed to a master flange 109 of the lens drive mechanism 111 (discussed below). The CCD image sensor 110 is an example of an imaging element. The imaging element may instead be a CMOS image sensor, for example.

The first lens group G1, second lens group G2, and third lens group G3 are driven by the lens drive mechanism 111. The lens drive mechanism 111 will now be described in detail.

Lens Drive Mechanism

As shown in FIGS. 4 to 6, the lens drive mechanism 111 comprises a first lens frame 101, a first rectilinear frame 102, a cam frame 103, a second rectilinear frame 104, a second lens frame 105, a shutter unit 106, a fixed frame 107, a third lens frame 108, and the master flange 109.

The first lens frame 101 supports the first lens group G1. The second lens frame 105 supports the second lens group G2. The third lens frame 108 supports the third lens group G3. The first lens frame 101, the second lens frame 105, and the third lens frame 108 are driven in the optical axis direction with respect to the fixed frame 107. The cam frame 103 rotates with respect to the fixed frame 107 and the master flange 109. The first lens frame 101, the first rectilinear frame 102, the second rectilinear frame 104, the second lens frame 105, the shutter unit 106, and the third lens frame 108 do not rotate with respect to the fixed frame 107 or the master flange 109.

(1) Fixed Frame 107

The fixed frame 107 is a substantially cylindrical member. In the stowed state shown in FIG. 2, the first lens frame 101, the first rectilinear frame 102, the cam frame 103, the second rectilinear frame 104, the second lens frame 105, the shutter unit 106, and the third lens frame 108 are stowed in the fixed frame 107.

As shown in FIG. 6, the fixed frame 107 rotatably supports a drive gear 114. The drive gear 114 is able to rotate with respect to the fixed frame 107, around a rotary shaft disposed parallel to the optical axis AX. A plurality of attachment portions 115 are formed on the outer peripheral part of the fixed frame 107. The lens barrel 100 is attached to the housing 2 via the attachment portions 115. The attachment portions 115 are screwed to the housing 2, for example.

The master flange 109 is fixed to the fixed frame 107. More specifically, screw bosses are formed on the fixed frame 107. The master flange 109 is fixed to the fixed frame 107 by screws and the screw bosses of the fixed frame 107.

A zoom motor unit 116 is fixed to the fixed frame 107. The zoom motor unit 116 rotationally drives the cam frame 103 through the drive gear 114.

Figure 7:
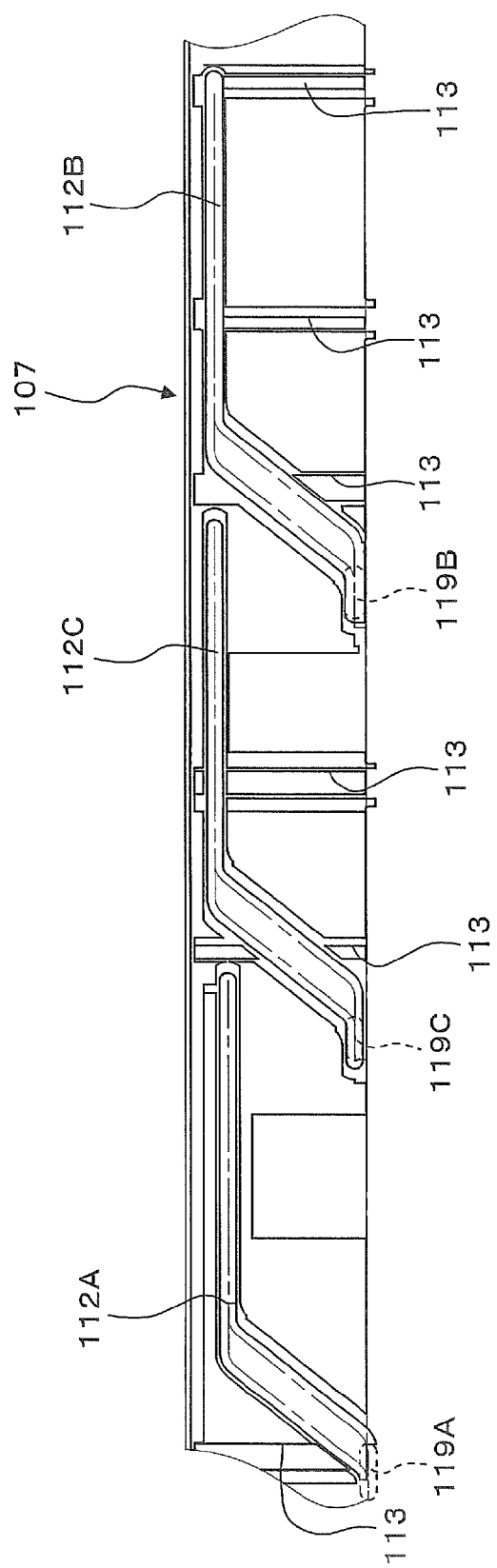
FIG. 7 is a development view of a fixed frame.

As shown in FIG. 7, the fixed frame 107 has three first cam grooves 112A, 112B, and 112C, and six rectilinear guide grooves 113. The first cam grooves 112A, 112B, and 112C and the rectilinear guide grooves 113 are formed in the inner peripheral face of the fixed frame 107. The fixed frame 107 supports the cam frame 103 via the first cam grooves 112A, 112B, and 112C. The fixed frame 107 also supports the first rectilinear frame 102 via the rectilinear guide grooves 113. The rectilinear guide grooves 113 restrict the rotation of the first rectilinear frame 102, and extend in the optical axis direction.

(2) Cam Frame 103

As shown in FIG. 5, the cam frame 103 (an example of a drive frame) is provided to drive the first lens frame 101 and the shutter unit 106 in the optical axis direction. The cam frame 103 is disposed rotatably with respect to the first rectilinear frame 102 and integrally movably in the optical axis direction. The cam frame 103 has a substantially cylindrical cam frame main body 117 (an example of a cam mechanism) and a substantially annular flange 118 (an example of a flange).

From the stowed state shown in FIGS. 8A and 8B to the initial imaging state shown in FIGS. 9A and 9B, the cam frame 103 moves in the optical axis direction while rotating with respect to the fixed frame 107. From the initial imaging state shown in FIGS. 9A and 9B to the telephoto end shown in FIGS. 10A and 10B, the cam frame 103 rotates without moving in the optical axis direction, with respect to the fixed frame 107.

The stowed state of the lens barrel 100 can also be expressed as the state in which the combined length of the fixed frame 107 and the cam frame 103 in the optical axis direction is shortest.

As shown in FIG. 5, the flange 118 of the cam frame 103 protrudes outward from the rear end of the cam frame main body 117.

Figure 11:
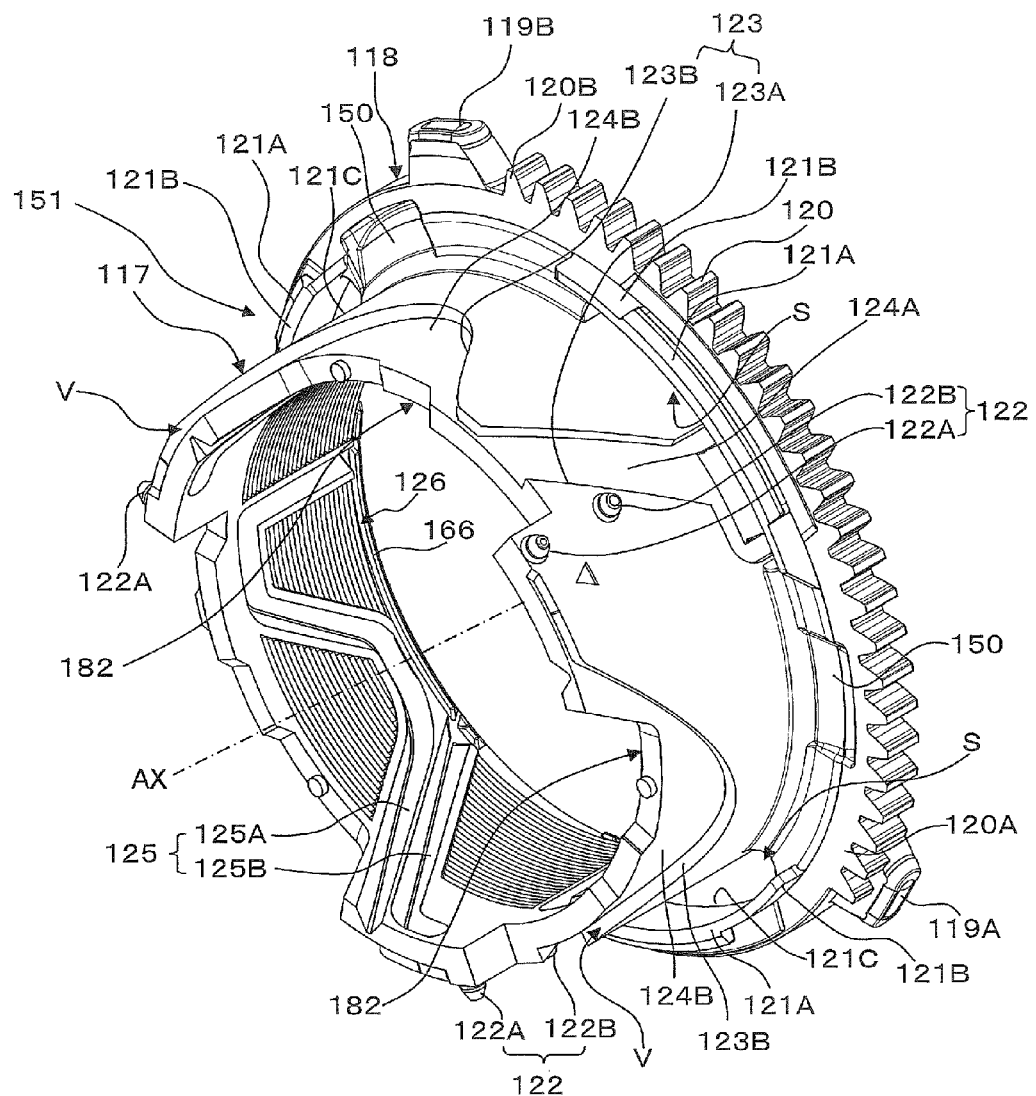
FIG. 11 is an oblique view of a cam frame.
Figure 12:
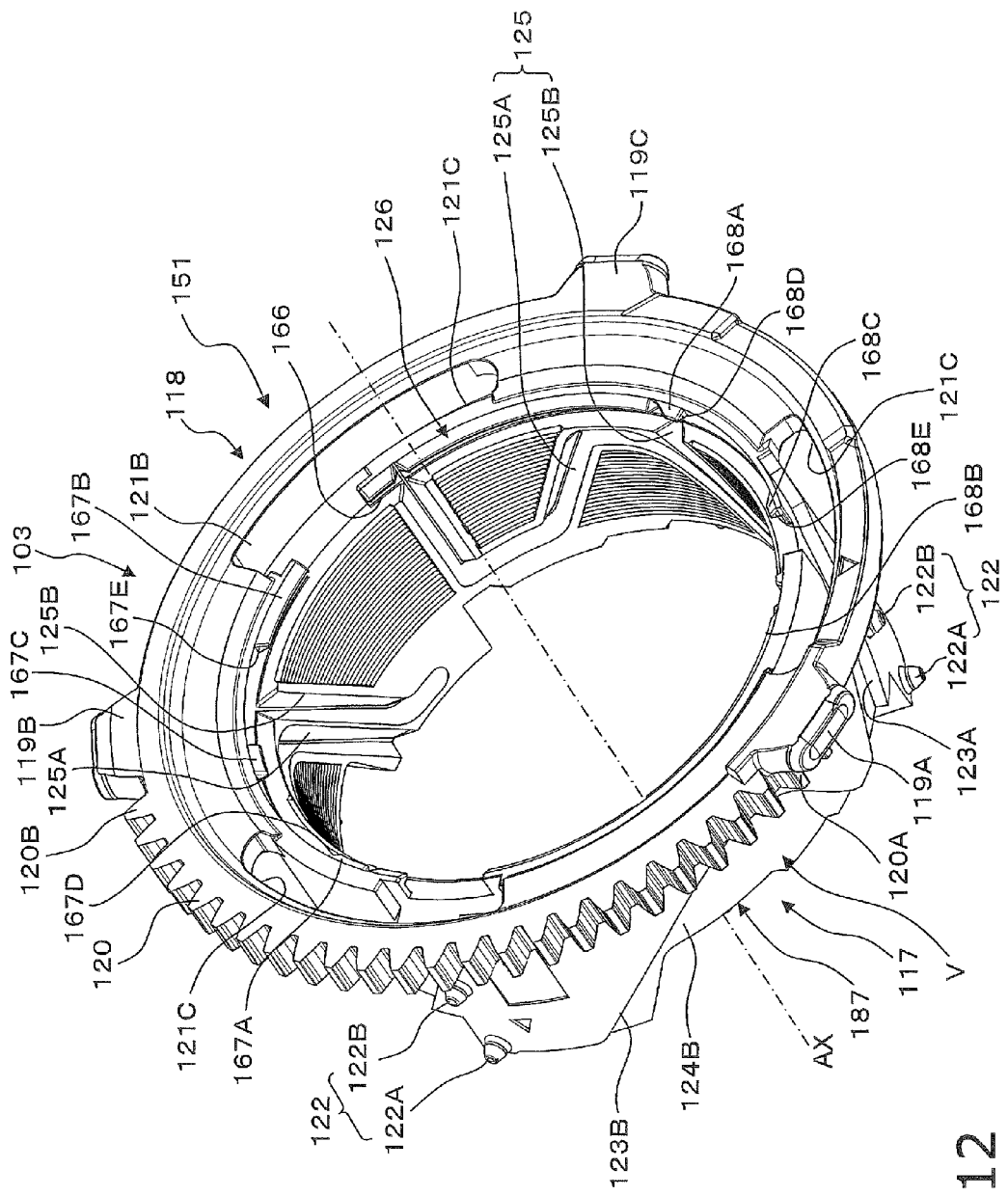
FIG. 12 is an oblique view of a cam frame.
Figure 13:
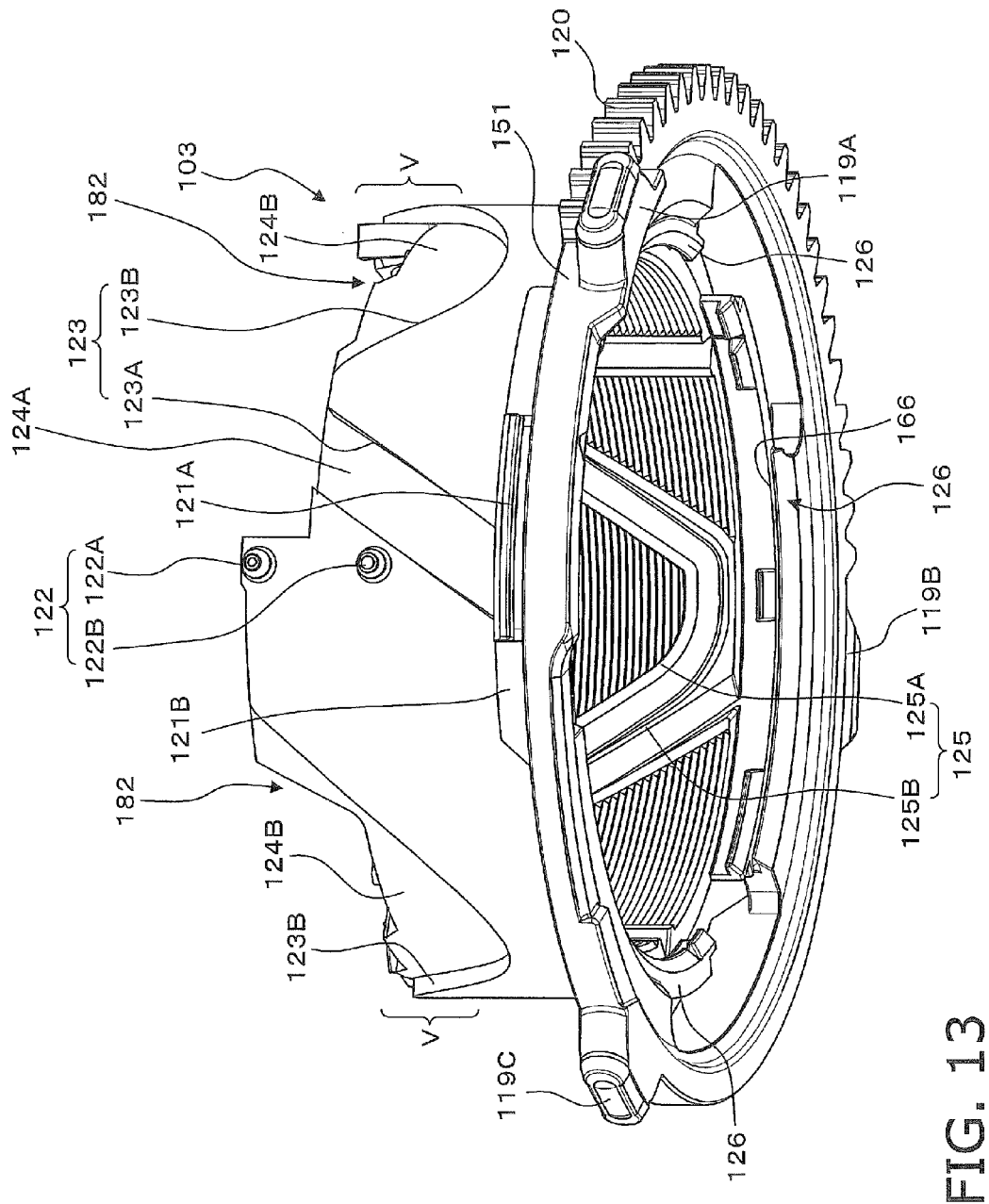
FIG. 13 is an oblique view of a cam frame.

As shown in FIGS. 11 to 13, the flange 118 has a substantially annular flange main body 151, three cam followers 119A, 119B, and 119C, a gear portion 120, three first bayonet couplers 121, and recesses 150 (an example of a first insertion portion).

Figure 25:
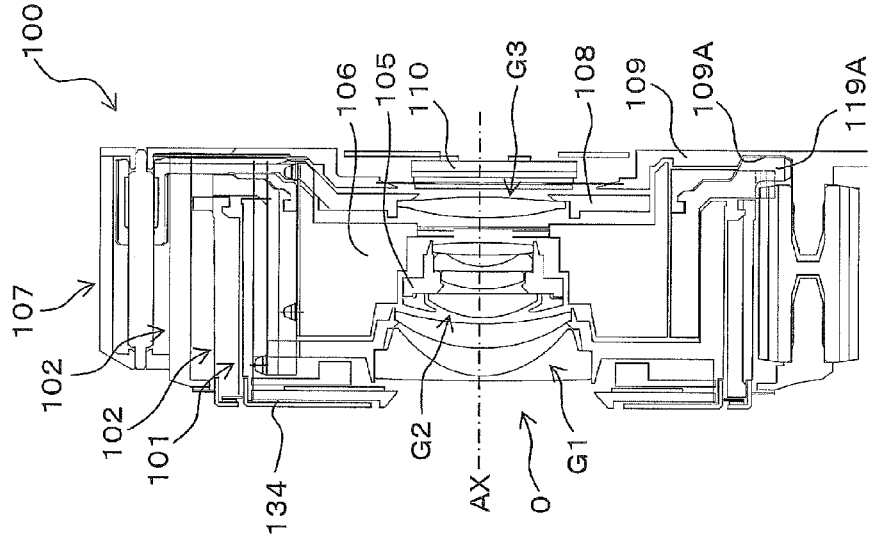
FIG. 25 is a simplified cross section of the lens barrel (stowed state).

The cam followers 119A, 119B, and 119C extend outward in the radial direction from the flange main body 151, and have a shape that is slender in the peripheral direction. The cam followers 119A, 119B, and 119C are such that the spacing between the cam follower 119A and the cam follower 119B is longer than the spacing between other adjacent cam followers. Also, the cam followers 119A, 119B, and 119C are disposed unevenly in the peripheral direction, and the cam follower 119A is offset to the rear (the image plane side) with respect to the cam followers 119B and 119C (see FIGS. 8 and 25).

The cam follower 119A is inserted into a first cam groove 112A of the fixed frame 107 shown in FIG. 7. The cam follower 119B is inserted into a first cam groove 112B of the fixed frame 107 shown in FIG. 7. The cam follower 119C is inserted into a first cam groove 112C of the fixed frame 107 shown in FIG. 7. As shown in FIG. 11, the cam follower 119A is offset to the rear with respect to the cam followers 119B and 119C. The first cam groove 112A is also offset to the rear with respect to the first cam grooves 112B and 112C. The cam frame 103 is supported by the fixed frame 107 via the cam followers 119A to 119C.

When the fixed frame 107 and the cam frame 103 rotate relatively, the cam followers 119A to 119C are guided by the first cam grooves 112A to 112C, respectively. When this happens, the cam frame 103 moves in the optical axis direction while rotating with respect to the fixed frame 107.

The gear portion 120 shown in FIGS. 11 to 13 meshes with the drive gear 114 (see FIG. 6). The cam frame 103 is rotationally driven by the zoom motor unit 116 through the gear portion 120 and the drive gear 114. As shown in FIG. 13, the gear portion 120 extends in a slender shape in the peripheral direction along the outer peripheral part of the flange main body 151.

As shown in FIGS. 11 to 13, the gear portion 120 is disposed at substantially the same position as the cam followers 119B and 119C in the optical axis direction. On the other hand, as shown in FIG. 13, the cam follower 119A is offset to the rear with respect to the cam followers 119B and 119C. Specifically, the gear portion 120 is offset from the cam follower 119A in the optical axis direction.

As shown in FIGS. 11 to 13, the gear portion 120 has a first end 120A and a second end 120B. As shown in FIG. 11, the first end 120A is disposed in front of (on the subject side of) the cam follower 119A. In other words, the cam follower 119A is disposed to the rear of the first end 120A (on the image plane side). The first end 120A is integral with the cam follower 119A, and touches the cam follower 119A. In contrast, the second end 120B is disposed aligned with the cam follower 119B, but with a space in between in the peripheral direction. The cam follower 119B is not integral with the second end 120B.

Figure 14:
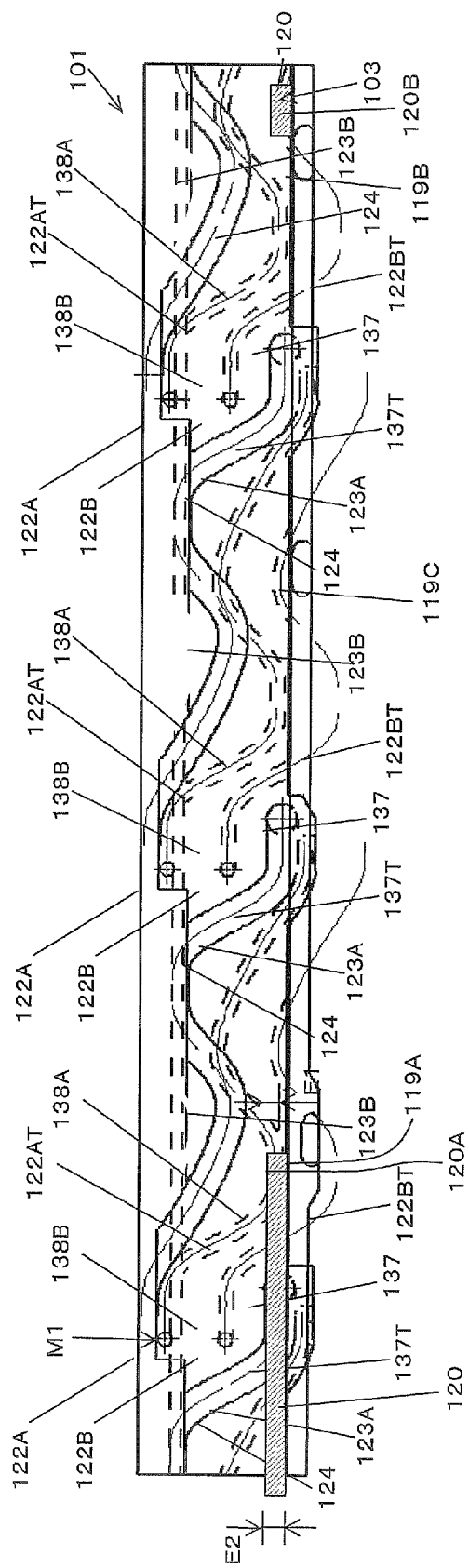
FIG. 14 is a development view of when a second cam groove and an auxiliary groove are retracted.

Also, as shown in FIG. 14, the length E1 of the first end 120A in the optical axis direction is shorter than the length E2 of the gear portion 120 in the optical axis direction in order to shorten the total length of the first end 120A and the cam follower 119A in the optical axis direction. The first end 120A meshes with the drive gear 114 when the lens barrel 100 is in its stowed state. Meanwhile, the second end 120B meshes with the drive gear 114 when the lens barrel 100 is at the telephoto end.

As shown in FIGS. 11 to 13, the three first bayonet couplers 121 are disposed spaced apart substantially equidistantly in the peripheral direction of the cam frame main body 117. The first bayonet couplers 121 protrude forward from the flange main body 151. The first bayonet couplers 121 engage with third bayonet couplers 129 (see FIG. 5) of the first rectilinear frame 102. The first bayonet couplers 121 are disposed on the outer peripheral side of the cam frame main body 117. A gap is left between the first bayonet couplers 121 and the cam frame main body 117, forming a stowage space S. In other words, the stowage space S is formed by the first bayonet couplers 121 and the cam frame main body 117. The end of the first lens frame 101 (see FIG. 5) can be inserted into the stowage space S.

As shown in FIG. 11, the first bayonet couplers 121 each have a base plate 121B and a bayonet 121A. The base plates 121B (an example of a base portion) protrude forward from the flange main body 151. The base plates 121B are flat portions that extend in a slender shape in the peripheral direction of the cam frame 103. The stowage space S is formed between the base plates 121B and the cam frame main body 117. The bayonets 121A (an example of a guide protrusion) protrude outward from the base plates 121B in the radial direction of the cam frame main body 117. The bayonets 121A extend in a slender shape in the peripheral direction along the outer peripheral faces of the base plates 121B.

In this embodiment, as shown in FIGS. 11 and 13, the length of the bayonets 121A in the peripheral direction is shorter than the length of the base plates 121B in the peripheral direction. The bayonets 121A are inserted into rotary grooves 175 (see FIG. 5) of the third bayonet couplers 129 provided to the first rectilinear frame 102.

As shown in FIGS. 11 and 12, the flange main body 151 has through-holes 121C. More precisely, the flange main body 151 has three through-holes 121C. The through-holes 121C are formed between the cam frame main body 117 and the base plates 121B. In other words, at least part of the space (an example of a second space) formed by the through-holes 121C (an example of a second insertion portion) is formed between the cam frame main body 117 and the base plates 121B. More specifically, the through-holes 121C are disposed on the inner peripheral side of the first bayonet couplers 121. More precisely, the through-holes 121C are disposed between the first bayonet couplers 121 and the cam frame main body 117. The through-holes 121C extend in a slender shape in the peripheral direction. When the lens barrel 100 is in its stowed state, three protrusions 101C of the first lens frame 101 are respectively inserted into the three through-holes 121C. The through-holes 121C are disposed at substantially the same positions as the base plates 121B in the peripheral direction.

As shown in FIGS. 11 to 13, three front cam grooves 125A, three rear cam grooves 125B, and three second bayonet couplers 126 are formed on the inner face of the cam frame main body 117. The front cam grooves 125A and the rear cam grooves 125B guide the shutter unit 106. Front cam pins 139A of the shutter unit 106 are inserted into the front cam grooves 125A. Rear cam pins 139B of the shutter unit 106 are inserted into the rear cam grooves 125B. The second bayonet couplers 126 engage with a first rotary guide 162 and a second rotary guide 163 (discussed below) of the second rectilinear frame 104.

As shown in FIG. 11, the recesses 150 are formed in the flange 118. More precisely, three recesses 150 are formed in the flange 118. The recesses 150 are disposed substantially spaced equidistantly in the peripheral direction of the cam frame 103. The recesses 150 are disposed between adjacent first bayonet couplers 121.

The recesses 150 form spaces (an example of a first space) which at least part of first guide protrusions 136A enter. As to the depth of the recesses 150 in the optical axis direction, the depth of the recesses 150 on the outside in the radial direction is less than the depth of the recesses 150 on the inside in the radial direction. The recesses 150 gradually become deeper moving from the cam frame main body 117 toward the outside in the radial direction.

When the first lens frame 101 has moved closest to the flange 118, the three first guide protrusions 136A (see FIG. 5) formed on the first lens frame 101 go into the three recesses 150. The length of the recesses 150 in the peripheral direction is greater than the length of the first guide protrusions 136A in the peripheral direction.

As shown in FIGS. 11 to 13, the cam frame 103 has three sets of cam followers 122 and three auxiliary grooves 123. The cam followers 122 and the auxiliary grooves 123 are formed on the outer peripheral face of the cam frame main body 117.

As shown in FIGS. 11 to 13, the cam followers 122 each have a front cam pin 122A (an example of a first cam follower or a second cam follower) and a rear cam pin 122B (an example of a first cam follower or a second cam follower). That is, the three front cam pins 122A and the three rear cam pins 122B are provided to the outer peripheral face of the cam frame main body 117. In this embodiment, the three front cam pins 122A and the three rear cam pins 122B all have the same shape.

The three sets of cam followers 122 are disposed equidistantly spaced apart in the peripheral direction. The paired front cam pins 122A and rear cam pins 122B are disposed spaced apart in the optical axis direction. The front cam pins 122A are disposed in front of the rear cam pins 122B. The positions of the front cam pins 122A and the rear cam pins 122B in the peripheral direction are the same. Consequently, the shape of the outer periphery of the cam frame 103 can be simplified, and it is easier to produce a mold for the cam pin-shaped parts in injection molding.

Figure 15:
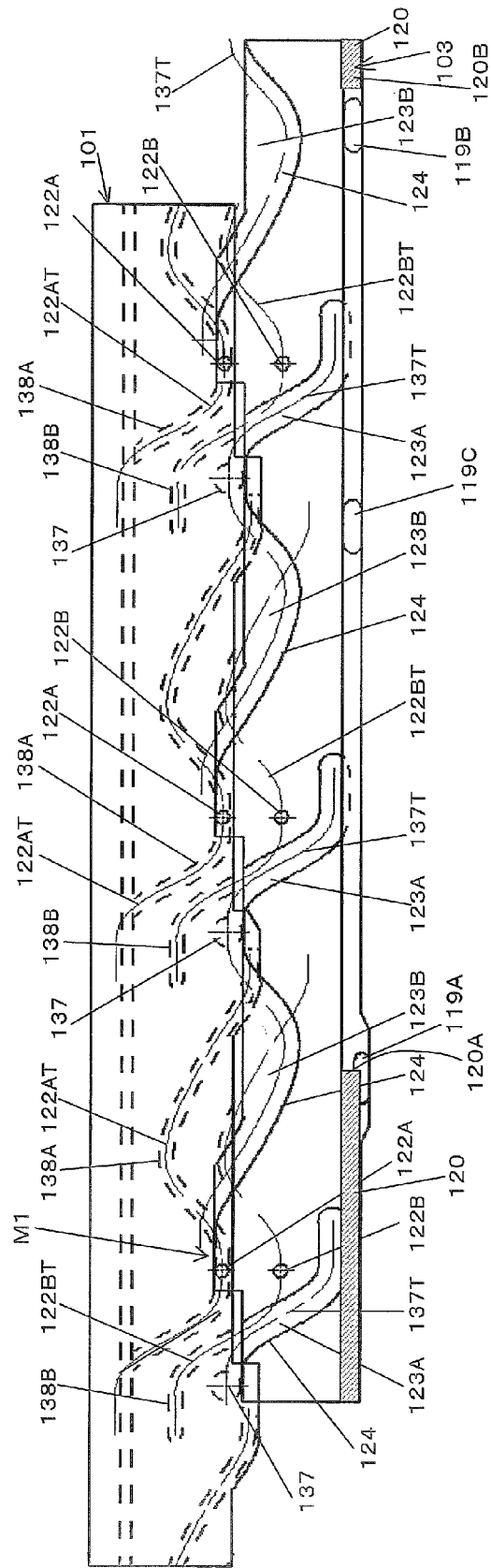
FIG. 15 is a development view of when a second cam groove and an auxiliary groove are at the wide angle end.
Figure 16:
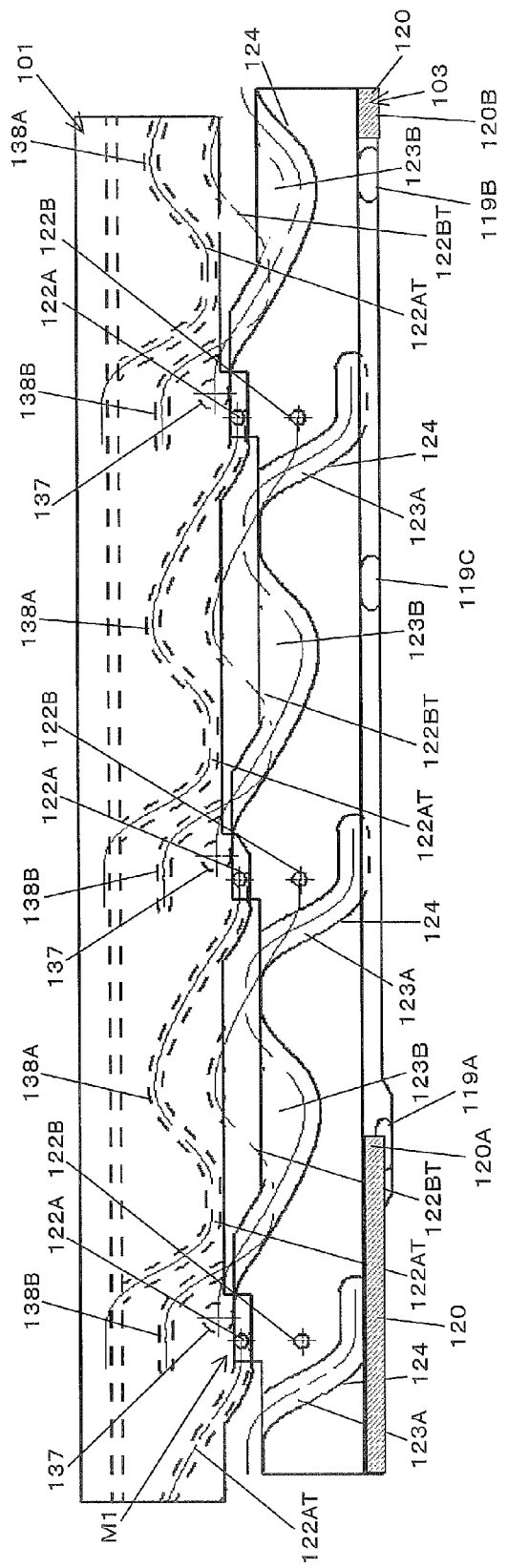
FIG. 16 is a development view of when a second cam groove and an auxiliary groove are at the telephoto end.

As shown in FIGS. 14 to 16, the front cam pins 122A are inserted into front cam grooves 138A (an example of a first guide cam groove or a second guide cam groove) of the first lens frame 101 (discussed below). The rear cam pins 122B are inserted into rear cam grooves 138B (an example of a first guide cam groove or a second guide cam groove) of the first lens frame 101 (discussed below). The cam followers 122 (122A, 122B), the front cam grooves 138A, and the rear cam grooves 138B constitute a cam mechanism M1 (an example of a cam mechanism).

The cam mechanism M1 guides the first lens frame 101 in the optical axis direction. In other words, the cam frame 103 uses the cam mechanism M1 to guide the first lens frame 101 in the optical axis direction. During operation in which the first lens frame 101 and the cam frame 103 rotate relatively, the cam mechanism M1 has a first state, a second state, and a third state. The first state is a state in which the front cam pins 122A are guided by the front cam grooves 138A. The second state is a state in which the front cam pins 122A are guided by the front cam grooves 138A, and the rear cam pins 122B are guided by the rear cam grooves 138B. The third state is a state in which the rear cam pins 122B are guided by the rear cam grooves 138B. In the third state, at least part of the front cam pins 122A goes into recesses 101E in a lens support 101D. In the first state, the rear cam pins 122B are not guided by the rear cam grooves 138B. Also, in the third state, the front cam pins 122A are not guided by the front cam grooves 138A.

With this cam mechanism M1, compared to when just the front cam grooves 138A and the front cam pins 122A are provided, the amount of movement of the first lens frame 101 in the optical axis direction can be lengthened by an amount equal to how much the rear cam pins 122B are guided by the rear cam grooves 138B in the third state. The front cam pins 122A are disposed in front of the rear cam pins 122B. The positions of the front cam pins 122A and the rear cam pins 122B in the peripheral direction are the same. Consequently, the shape of the outer periphery of the cam frame 103 can be simplified, and it is easier to produce a mold for the cam pin-shaped parts in injection molding.

As shown in FIG. 11, the auxiliary grooves 123 in the cam frame 103 are formed so as to trace the path over which reinforcing portions 137 (discussed below) move. The path over which the reinforcing portions 137 move is indicated in FIGS. 14 and 15 by 137T. More specifically, the movement path 137T of the reinforcing portions 137 is the path traced by the reinforcing portions 137 when the cam followers 122 of the cam frame 103 shown in FIG. 11 move along the second cam grooves 138 (138A, 138B; see FIG. 21) of the first lens frame 101.

As shown in FIG. 11, the auxiliary grooves 123 have a first section 123A and a second section 123B. The first section 123A and second section 123B have bottom faces 124A and 124B, respectively.

As shown in FIG. 11, the first section 123A is a groove formed in the outer peripheral face of the cam frame main body 117. The first section 123A is not open at the front. The phrase "the first section 123A is not open at the front" means that the first section 123A has the bottom face 124A and a pair of side faces. In the first section 123A, it can also be said that there is another wall face constituting a side face, in front of the bottom face 124A (on the subject side).

Meanwhile, as shown in FIG. 11, the second section 123B is open at the front. The phrase "the second section 123B is open at the front" means that the second section 123B has only one side face (the other side face) in addition to the bottom face 124B. The second section 123B can be called a groove, but can also be thought of as a depression or cut-out formed by thinning part of the cam frame main body 117. In the second section 123B, it an also be said that there is no other wall face in front of the wall face 124 (on the subject side).

The second section 123B is formed by a thin-wall part 182 that is thinner than the surrounding part. The thickness of the thin-wall part 182 is less than the standard thickness of the cam frame main body 117. Accordingly, cut-out spaces V formed by the thin-wall part 182 and the surrounding part along the bottom face 124B are formed at three places on the outer peripheral part of the cam frame main body 117. When the first lens frame 101 and the cam frame 103 rotate relatively, fixing portions 172 of a barrier unit 134 (discussed below) goes into these cut-out spaces V. Just as with the second section 123B, the first section 123A may be open at the front.

(3) First Rectilinear Frame 102

As shown in FIG. 5, the first rectilinear frame 102 is provided to restrict the rotation of the first lens frame 101 with respect to the fixed frame 107. The first rectilinear frame 102 is supported by the fixed frame 107. The first rectilinear frame 102 has a substantially cylindrical main body part 102A and six rectilinear guide projections 127. The rectilinear guide projections 127 protrude outward in the radial direction from the outer face of the body part 102A.

The first rectilinear frame 102 will now be described in detail. The rectilinear guide projections 127 are inserted into the rectilinear guide grooves 113 (see FIG. 7) of the fixed frame 107. The rectilinear guide projections 127 are guided in the optical axis direction by the rectilinear guide grooves 113. The first rectilinear frame 102 is supported by the fixed frame 107 via the rectilinear guide projections 127 and the rectilinear guide grooves 113. The rectilinear guide projections 127 and the rectilinear guide grooves 113 allow the first rectilinear frame 102 to move in the optical axis direction with respect to the fixed frame 107, and restrict the rotation of the first rectilinear frame 102 with respect to the fixed frame 107.

As shown in FIG. 5, six rectilinear guide grooves 128 (an example of a rectilinear groove) and the third bayonet couplers 129 are formed on the inner face of the first rectilinear frame 102. The rectilinear guide grooves 128 extend in the optical axis direction. The third bayonet couplers 129 have the rotary grooves 175 that extend in the peripheral direction.

The third bayonet couplers 129 engage with the first bayonet couplers 121 of the cam frame 103 (see FIG. 11). Since the third bayonet couplers 129 and the first bayonet couplers 121 are engaged, the first rectilinear frame 102 moves integrally with the cam frame 103 in the optical axis direction, and the cam frame 103 is able to rotate with respect to the first rectilinear frame 102.

(4) Second Rectilinear Frame 104

The second rectilinear frame 104 is provided to restrict the rotation of the shutter unit 106 with respect to the fixed frame 107. As shown in FIG. 5, the second rectilinear frame 104 has a first guide plate 131A (an example of a rectilinear guide), a second guide plate 131B (an example of a rectilinear guide), three projections 132, the first rotary guide 162, and the second rotary guide 163.

Figure 17:
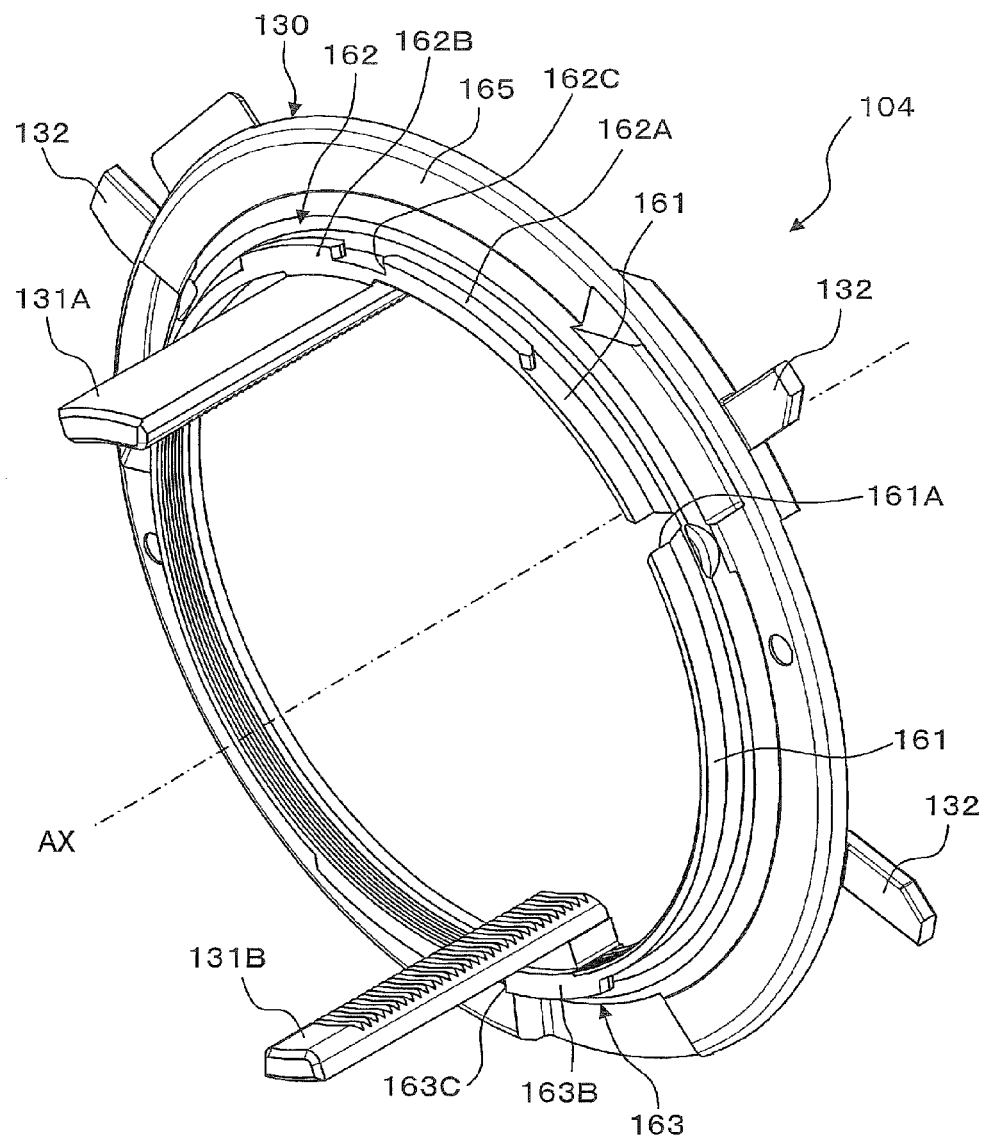
FIG. 17 is an oblique view of a second rectilinear frame.

The second rectilinear frame 104 will now be described in detail. As shown in FIG. 17, the an annular portion 130 has a disk portion 165 and an inner peripheral protrusion 161 (an example of a rib). The inner peripheral protrusion 161 protrudes in the optical axis direction from the inner peripheral part of the disk portion 165. The inner peripheral protrusion 161 is a substantially annular portion, and is formed along the inner peripheral part of the disk portion 165.

As shown in FIG. 17, the first guide plate 131A and the second guide plate 131B extend forward from the inner peripheral part of the annular portion 130, and are disposed substantially equidistantly spaced in the peripheral direction. More precisely, the first guide plate 131A and the second guide plate 131B extend forward from the inner peripheral face of the inner peripheral protrusion 161 of the annular portion 130. The first guide plate 131A and the second guide plate 131B are respectively inserted into rectilinear guide grooves 140 (see FIG. 6) of the shutter unit 106 (discussed below).

The projections 132 protrude outward in the radial direction from the outer peripheral part of the annular portion 130. The three projections 132 are respectively inserted into the three rectilinear guide grooves 113 of the fixed frame 107 (see FIG. 7). The second rectilinear frame 104 is supported by the fixed frame 107 via the projections 132 and the rectilinear guide grooves 113. Since the projections 132 are inserted into the rectilinear guide grooves 113, the second rectilinear frame 104 is able to move in the optical axis direction with respect to the fixed frame 107, and its rotation is restricted with respect to the fixed frame 107.

As shown in FIG. 17, the first rotary guide 162 is disposed at the base of the first guide plate 131A. The first rotary guide 162 extends in a slender shape in the peripheral direction.

Figure 18:
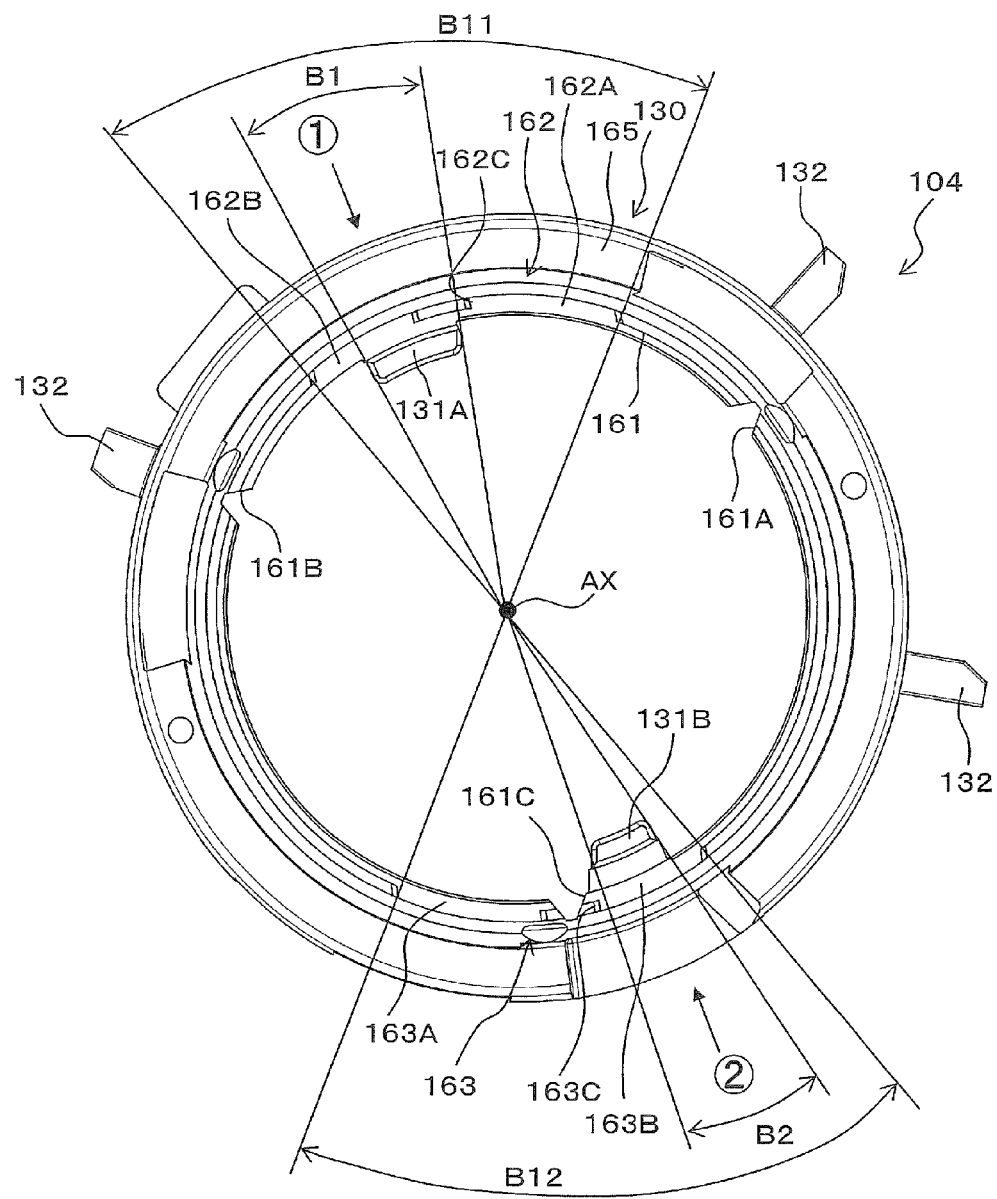
FIG. 18 is an oblique view of a second rectilinear frame.
Figures 19A, 19B:
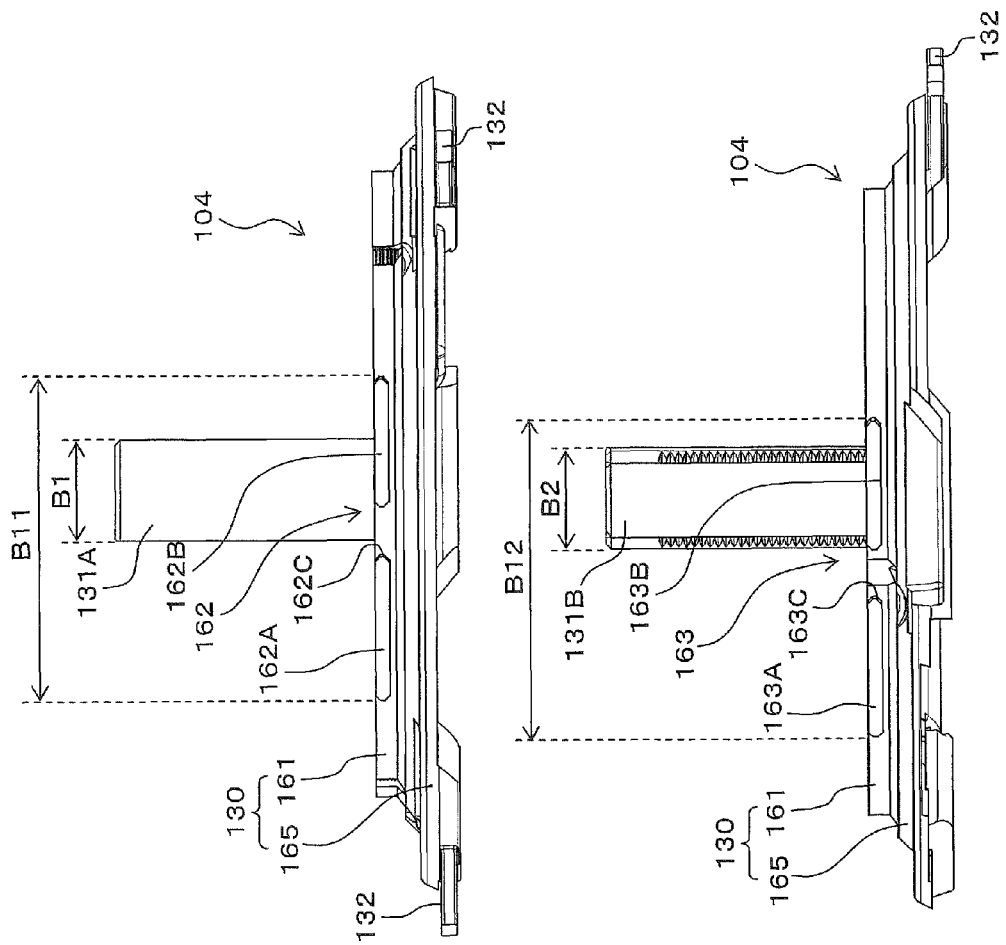
FIG. 19A is a side view of the second rectilinear frame.
FIG. 19B is a side view of the second rectilinear frame.

As shown in FIG. 18, the length of the first rotary guide 162 in the peripheral direction is greater than the length of the first guide plate 131A in the peripheral direction. The first guide plate 131A is disposed within the range in the peripheral direction over which the first rotary guide 162 is formed. As shown in FIG. 19A, a first region B1 of the annular portion 130 occupied by the first guide plate 131A in the peripheral direction is disposed on the inside of a second region B 11 of the annular portion 130 occupied by the first rotary guide 162 in the peripheral direction. When the second rectilinear frame 104 is viewed in the radial direction, it can also be said that the first rotary guide 162 protrudes on both sides of the first guide plate 131A.

As shown in FIG. 17, the first rotary guide 162 has a first bayonet 162A and a second bayonet 162B. The first bayonet 162A and the second bayonet 162B protrude outward in the radial direction from the outer peripheral face of the inner peripheral protrusion 161 of the annular portion 130. The first bayonet 162A and the second bayonet 162B extend in a slender shape in the peripheral direction along the outer peripheral face of the inner peripheral protrusion 161. The first bayonet 162A and the second bayonet 162B are inserted into rotary guide grooves 166 of the second bayonet couplers 126 of the cam frame 103 (see FIGS. 11 to 13).

As shown in FIG. 17, a slit 162C is formed in the peripheral direction between the first bayonet 162A and the second bayonet 162B. The first rotary guide 162 can also be said to be divided in two in the peripheral direction by the slit 162C. The slit 162C is disposed around the base of the first guide plate 131A.

Also, as shown in FIG. 18, the length of the slit 162C in the peripheral direction is less than the length of the first guide plate 131A in the peripheral direction. As shown in FIG. 19A, the end of the first bayonet 162A and/or the second bayonet 162B is disposed in a first region B2 occupied by the second guide plate 131B.

As shown in FIG. 17, the second rotary guide 163 is disposed at the base of the second guide plate 131B. The second rotary guide 163 extends in a slender shape in the peripheral direction.

As shown in FIG. 18, the length of the second rotary guide 163 in the peripheral direction is greater than the length of the second guide plate 131B in the peripheral direction. The second guide plate 131B is disposed within the range in the peripheral direction over which the second rotary guide 163 is formed. As shown in FIG. 19B, in the peripheral direction of the annular portion 130, the first region B2 occupied by the second guide plate 131B is disposed on the inside of a second region B12 of the annular portion 130 occupied by the second rotary guide 163 in the peripheral direction. When the second rectilinear frame 104 is viewed in the radial direction, it can also be said that the second rotary guide 163 protrudes on both sides of the second guide plate 131B.

As shown in FIGS. 17 and 18, the second rotary guide 163 has a first bayonet 163A and a second bayonet 163B. The first bayonet 163A and the second bayonet 163B protrude outward in the radial direction from the outer peripheral face of the inner peripheral protrusion 161 of the annular portion 130. The first bayonet 163A and the second bayonet 163B extend in a slender shape in the peripheral direction along the outer peripheral face of the inner peripheral protrusion 161. The first bayonet 163A and the second bayonet 163B are inserted into the rotary guide grooves 166 of the second bayonet couplers 126 of the cam frame 103 (see FIGS. 11 to 13).

As shown in FIGS. 17 and 18, a slit 163C is formed in the peripheral direction between the first bayonet 163A and the second bayonet 163B. It can also be said that the second rotary guide 163 is divided in two in the peripheral direction by the slit 163C. As shown in FIGS. 18 and 19B, the slit 163C is disposed near the range in the peripheral direction over which the second guide plate 131B is formed.

(5) First Lens Frame 101

Figure 20:
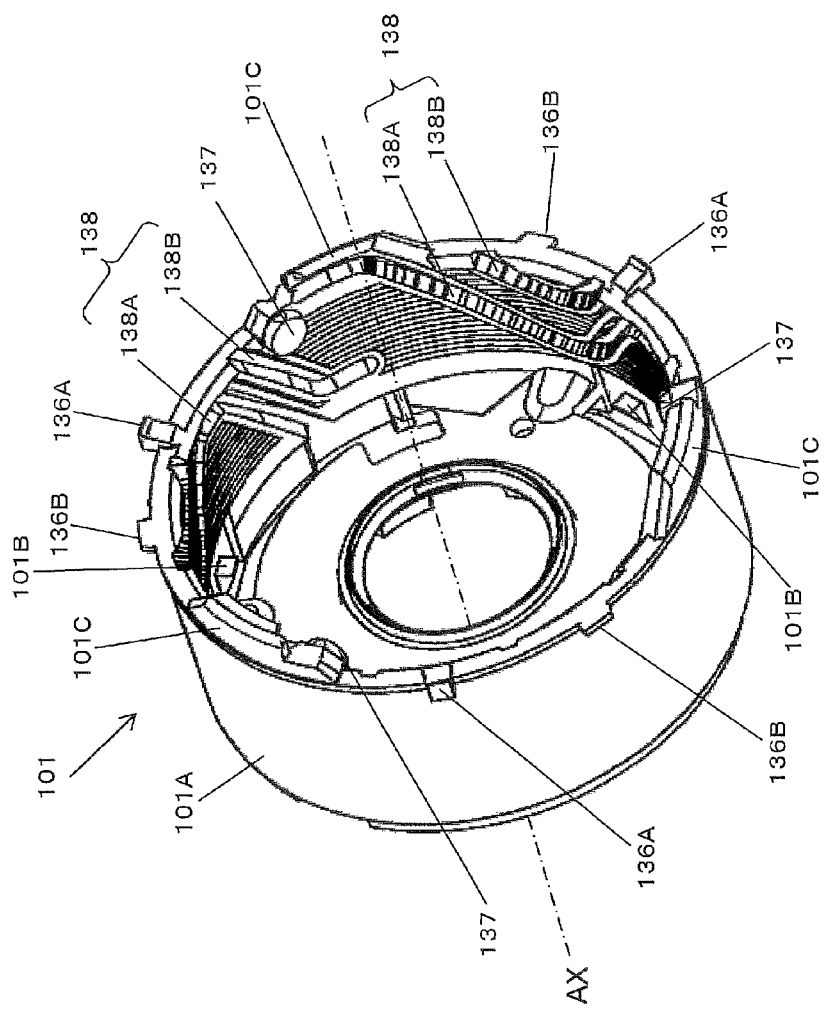
FIG. 20 is an oblique view of a first lens frame.

As shown in FIGS. 4 to 6 and FIGS. 8 to 10, the first lens frame 101 supports the first lens group G1. The first lens frame 101 is disposed so as to be able to rotate in the optical axis direction without rotating with respect to the fixed frame 107. As shown in FIG. 20, the first lens frame 101 has a main body portion 101A, the three first guide protrusions 136A (an example of rectilinear projections) the three protrusions 101C, the three reinforcing portions 137, and the lens support 101D that supports the first lens group G1.

As shown in FIGS. 8 to 10, the first lens group G1 is supported by the main body portion 101A.

The first lens frame 101 will now be described in detail. As shown in FIG. 20, the second cam grooves 138 are formed in the inner peripheral face of the main body portion 101A. As shown in FIGS. 14 to 16, the second cam grooves 138 have the three front cam grooves 138A and the three rear cam grooves 138B. The front cam pins 122A of the cam frame 103 are inserted into the front cam grooves 138A. The rear cam pins 122B of the cam frame 103 are inserted into the rear cam grooves 138B.

As shown in FIG. 20, the three protrusions 101C are disposed substantially equidistantly spaced in the peripheral direction of the first lens frame 101. The three protrusions 101C protrude rearward from the end of the main body portion 101A. In the stowed state of the lens barrel 100, the entire end (all the way around) of the first lens frame 101 is accommodated in the stowage space S. In the stowed state of the lens barrel 100, the protrusions 101C are inserted into the above-mentioned through-holes 121C of the cam frame 103.

As shown in FIG. 20, the three first guide protrusions 136A and three second guide protrusions 136B are disposed at the rear end of the main body portion 101A. The three first guide protrusions 136A and three second guide protrusions 136B protrude outward in the radial direction from the main body portion 101A. The first guide protrusions 136A and the second guide protrusions 136B are respectively inserted into the six rectilinear guide grooves 128 of the first rectilinear frame 102 (see FIGS. 5, 9, and 10). The three first guide protrusions 136A are disposed substantially equidistantly spaced in the peripheral direction. The length of the distal ends of the first guide protrusions 136A in the optical axis direction is greater than the length of the bases of the first guide protrusions 136A in the optical axis direction. The length of the first guide protrusions 136A in the optical axis direction gradually decreases toward the outside in the radial direction of the first lens frame 101. The distal ends of the first guide protrusions 136A protrude more toward the flange 118 side than the bases of the first guide protrusions 136A. The three second guide protrusions 136B are disposed substantially equidistantly spaced in the peripheral direction.

As shown in FIGS. 8, 9, 10, 20, and 21, the second guide protrusions 136B are plate-shaped portions. In contrast, the first guide protrusions 136A have a special shape. More specifically, the distal ends of the first guide protrusions 136A are thicker than the bases. The length of the first guide protrusions 136A in the optical axis direction gradually increases outward in the radial direction. The length of the distal ends of the first guide protrusions 136A in the optical axis direction is greater than the length of the second guide protrusions 136B in the optical axis direction. Also, the length of the distal ends of the first guide protrusions 136A in the optical axis direction is greater than the optical axis direction width of the third bayonet couplers 129 of the first rectilinear frame 102 (see FIG. 5). The distal ends of the first guide protrusions 136A protrude rearward more than the bases.

The first guide protrusions 136A and the second guide protrusions 136B engage with the rectilinear guide grooves 128, and as a result the first lens frame 101 is supported by the first rectilinear frame 102. The first lens frame 101 is able to move in the optical axis direction with respect to the first rectilinear frame 102, but its rotation is restricted with respect to the first rectilinear frame 102.

The lens support 101D has recesses 101E that are recessed in the optical axis direction. Here, an example is given in which the lens support 101D has the recesses 101E, but the recesses 101E may be replaced by holes that pass through in the optical axis direction.

As shown in FIGS. 2 and 3, the barrier unit 134 (an example of a barrier mechanism) is attached to the front side of the main body portion 101A. As shown in FIG. 5, the barrier unit 134 has a pair of barrier vanes 135, a barrier case 173, and three mounting portions 134A.

The barrier vanes 135 are provided openably and closeably to the barrier case 173. The barrier case 173 supports the barrier vanes 135. The barrier case 173 has an opening 173A (see FIGS. 2 and 3). In the stowed state of the lens barrel 100, the opening 173A is closed by the barrier vanes 135. Consequently, the barrier vanes 135 protect the first lens group G1 and block light from entering the optical system O (see FIG. 2). During imaging, the barrier vanes 135 are opened, and light is guided through the opening 173A to the optical system O (see FIG. 3).

Figure 21:
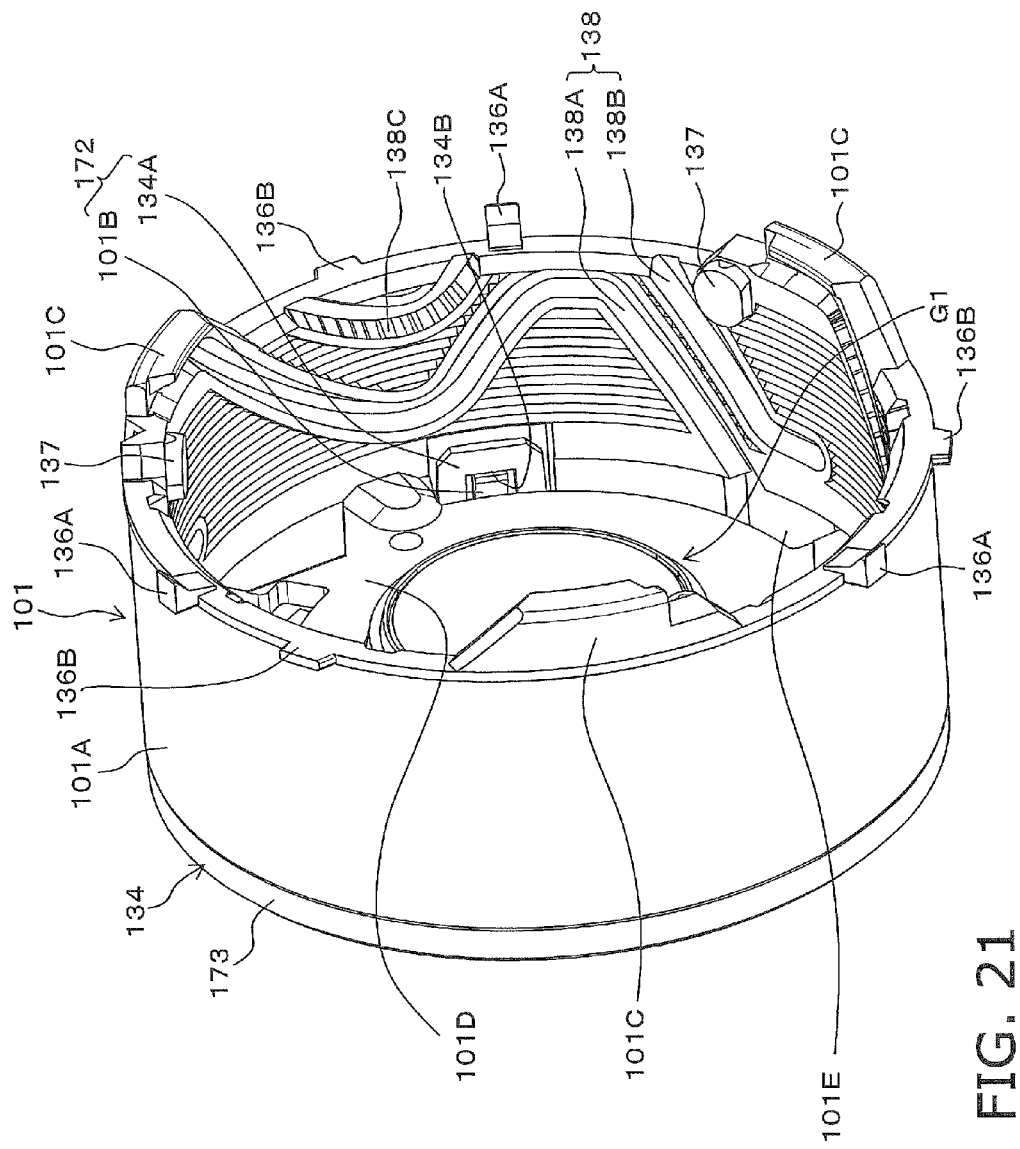
FIG. 21 is an oblique view of the state when the first lens frame and a barrier unit have been assembled.

As shown in FIG. 5, the three mounting portions 134A protrude in the optical axis direction from the barrier case 173. The three mounting portions 134A form part of the fixing portions 172. The three mounting portions 134A are disposed substantially equidistantly spaced in the peripheral direction. As shown in FIG. 21, the three mounting portions 134A have attachment holes 134B. Projections 101B of the first lens frame 101 are fitted into the attachment holes 134B, or the mounting portions 134A are hooked onto the projections 101B. Consequently, the barrier unit 134 is mounted to the first lens frame 101 via the mounting portions 134A and the projections 101B. Here, the mounting portions 134A and the projections 101B are called the fixing portions 172 of the barrier unit 134 and the first lens frame 101.

Figure 22A:
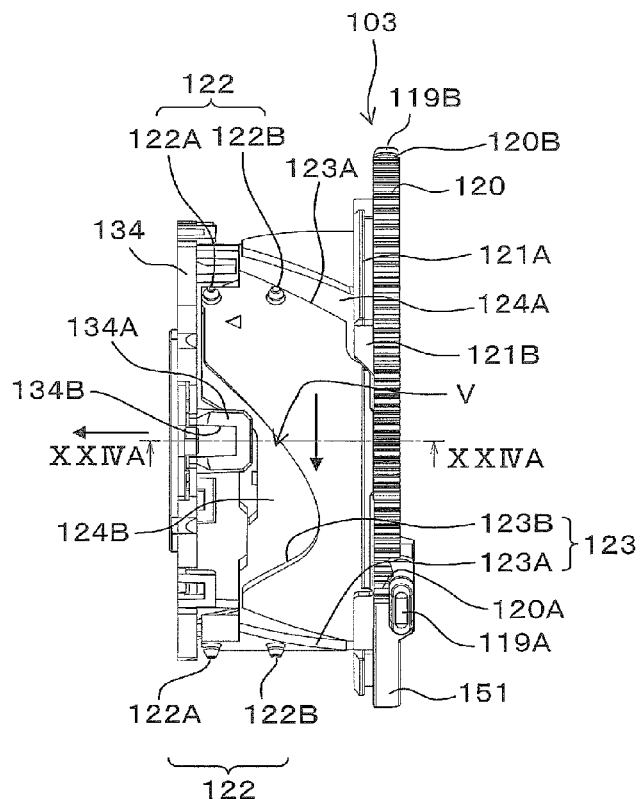
FIG. 22A shows the positional relation between the cam frame and the barrier unit in a stowed state.
Figure 22B:
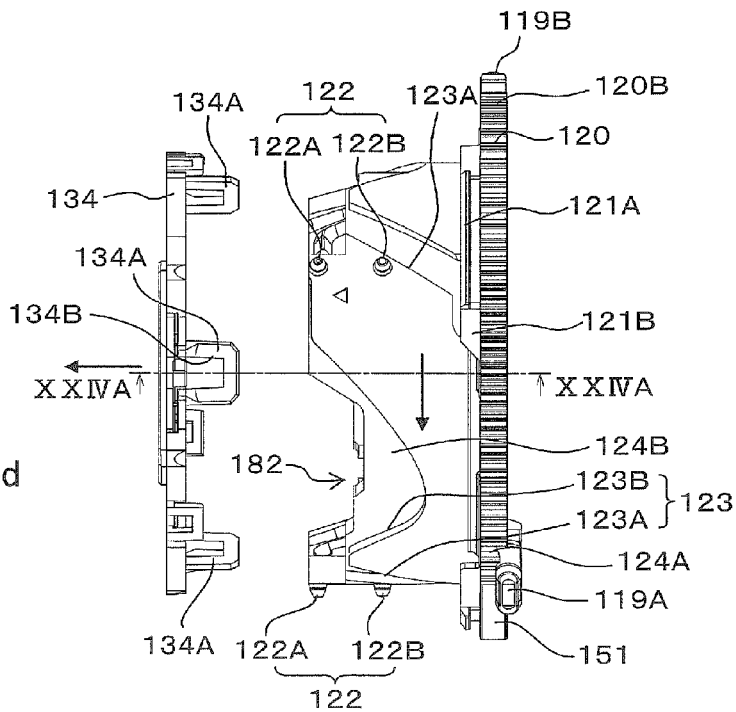
FIG. 22B shows the positional relation between the cam frame and the barrier unit in a deployed state.
Figure 23A:
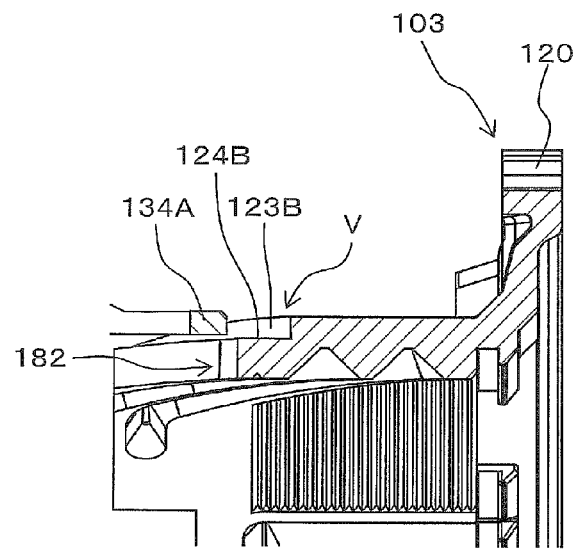
FIG. 23A is a cross section along the XXIVA-XXIVA line in FIG. 22A.
Figure 23B:
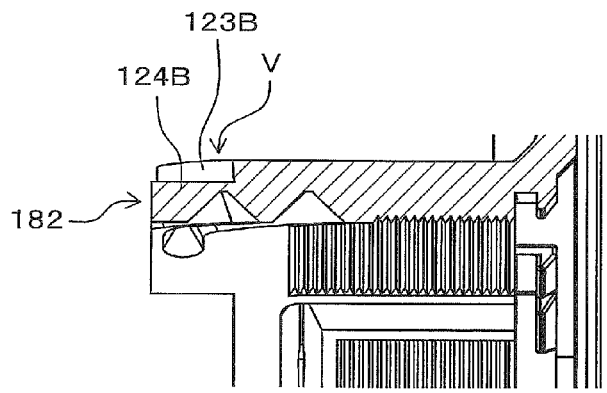
FIG. 23B is a cross section along the XXIVA-XXIVA line in FIG. 22B.

As discussed above, three cut-out spaces V are formed in the outer peripheral part of the cam frame 103. As shown in FIGS. 22A and 23A, when the lens barrel 100 is in its stowed state (retracted), part of the fixing portions 172 composed of the mounting portions 134A and the projections 101B goes into the cut-out spaces V. Meanwhile, as shown in FIGS. 22B and 23B, when the lens barrel 100 is deployed, the fixing portions 172 move away from the cut-out spaces V.

As shown in FIG. 21, the three reinforcing portions 137 protrude inward in the radial direction from the inner peripheral face of the main body portion 101A. The reinforcing portions 137 are inserted into the auxiliary grooves 123 of the cam frame 103 (see FIG. 11).

The reinforcing portions 137 basically do not touch the face in which the auxiliary grooves 123 are formed. Specifically, a tiny gap is formed between the reinforcing portions 137 and the cam frame 103. For example, if an external force is exerted on the lens barrel 100, and the various frames are deformed, some of the external force can be dispersed by having the reinforcing portions 137 come into contact with the side walls of the auxiliary grooves 123. Therefore, there will be less damage to the cam followers, such as the front cam pins 122A and the rear cam pins 122B. The configuration may also be such that the reinforcing portions 137 are in contact with the auxiliary grooves 123 from the outset.

(6) Second Lens Frame 105

As shown in FIG. 6, the second lens frame 105 supports the second lens group G2. The second lens frame 105 is movably supported by the shutter unit 106. More specifically, the second lens frame 105 is disposed movably within a plane perpendicular to the optical axis AX, with respect to the shutter unit 106. Movement of the second lens frame 105 in the optical axis direction with respect to the shutter unit 106 is restricted. The position of an optical image on the light receiving face of the CCD image sensor 110 can be varied by moving the second lens frame 105 within a plane perpendicular to the optical axis AX, with respect to the shutter unit 106. For example, the second lens frame 105 is driven so as to suppress blurring of the optical image caused by shaking of the digital camera 1. The drive of the second lens frame 105 with respect to the shutter unit 106 is performed by a drive unit (not shown).

(7) Shutter Unit 106

As shown in FIG. 6, the shutter unit 106 is provided to adjust the amount of light that reaches the CCD image sensor 110. The shutter unit 106 adjusts the timing at which the shutter vanes are opened and closed according to the preset shutter speed. When the shutter unit 106 is open, light that has passed through the opening in the shutter unit 106 reaches the CCD image sensor 110. On the other hand, when the shutter unit 106 is closed, the shutter unit 106 blocks light.

The shutter unit 106 has a shutter main body 106A, three sets of cam followers 139 (139A and 139B in FIG. 6), and the two rectilinear guide grooves 140. The three sets of cam followers 139 and the two rectilinear guide grooves 140 are formed on the outer peripheral face of the shutter main body 106A.

As shown in FIG. 6, the cam followers 139 have the front cam pins 139A and the rear cam pins 139B. More specifically, the three front cam pins 139A and the three rear cam pins 139B are provided to the outer peripheral face of the shutter main body 106A. The three front cam pins 139A all have the same shape. The three rear cam pins 139B all have the same shape. The three sets of cam followers 139 are disposed equidistantly spaced in the peripheral direction. The paired front cam pins 139A and rear cam pins 139B are disposed spaced apart in the optical axis direction. The front cam pins 139A are disposed in front of the rear cam pins 139B. The positions of the front cam pins 139A in the peripheral direction are offset from the positions of the rear cam pins 139B in the peripheral direction.

As shown in FIGS. 9A, 9A, and 10A and FIGS. 11 to 13, the front cam pins 139A are inserted into the front cam grooves 125A of the cam frame 103. As shown in FIG. 10A, the rear cam pins 139B are inserted into the rear cam grooves 125B of the cam frame 103. The shutter unit 106 is supported by the cam frame 103 via the cam followers 139, the front cam grooves 125A, and the rear cam grooves 125B. The cam followers 139, the front cam grooves 125A, and the rear cam grooves 125B constitute a cam mechanism M2 (an example of a cam mechanism).

The cam mechanism M2 guides the shutter unit 106 in the optical axis direction. In other words, the cam frame 103 uses the cam mechanism M2 to guide the shutter unit 106 in the optical axis direction. During operation in which the shutter unit 106 and the cam frame 103 rotate relatively, the cam mechanism M2 has a first state, a second state, and a third state. The first state is a state in which the front cam pins 139A are guided by the front cam grooves 125A. The second state is a state in which the front cam pins 139A are guided by the front cam grooves 125A, and the rear cam pins 139B are guided by the rear cam grooves 125B. The third state is a state in which the rear cam pins 139B are guided by the rear cam grooves 125B. In the first state, the rear cam pins 139B are not guided by the rear cam grooves 125B. And in the third state, the front cam pins 139A are not guided by the front cam grooves 125A.

With this cam mechanism M2, compared to when just the front cam grooves 125A and the front cam pins 139A are provided, the amount of movement of the shutter unit 106 in the optical axis direction can be lengthened by an amount equal to how much the rear cam pins 139B are guided by the rear cam grooves 125B in the third state.

The first guide plate 131A and the second guide plate 131E of the second rectilinear frame 104 are respectively inserted into the rectilinear guide grooves 140. Therefore, the shutter unit 106 is able to move in the optical axis direction with respect to the second rectilinear frame 104, but its rotation is restricted with respect to the second rectilinear frame 104.

(8) Third Lens Frame 108

As shown in FIG. 6, the third lens frame 108 supports the third lens group G3. The third lens frame 108 has a rectilinear guide 141, an anti-rotation portion 142, and a nut engagement portion 143. A first guide pole 144 is inserted into the rectilinear guide 141. The first guide pole 144 is fixed to the master flange 109. The first guide pole 144 extends forward from the master flange 109. The third lens frame 108 is supported movably in the optical axis direction by the rectilinear guide 141 and the first guide pole 144 with respect to the master flange 109. A second guide pole 145 is inserted into the anti-rotation portion 142. The second guide pole 145 is fixed to the master flange 109. The second guide pole 145 extends forward from the master flange 109. Rotation of the third lens frame 108 around the first guide pole 144 is restricted by the anti-rotation portion 142 and the second guide pole 145. A nut 149 of a focus motor unit 148 is engaged with the nut engagement portion 143.

The third lens frame 108 is driven in the optical axis direction with respect to the master flange 109 by the focus motor unit 148. The focus motor unit 148 has a motor 148A and a lead screw 148B that is rotated by the motor 148A. The motor 148A is fixed to the master flange 109. The lead screw 148B extends rearward from the motor 148A. The lead screw is threaded into the nut 149. The rotation of the nut 149 is restricted by the nut engagement portion 143. Therefore, when the lead screw rotates, the nut 149 is driven in the optical axis direction, and the nut engagement portion 143 is driven in the optical axis direction by the nut 149. That is, the third lens frame 108 is driven in the optical axis direction with respect to the fixed frame 107 by the focus motor unit 148.

(9) Master Flange 109

As shown in FIG. 6, the first guide pole 144 and the second guide pole 145 are fixed to the master flange 109. The master flange 109 supports the third lens frame 108 movably in the optical axis direction via the first guide pole 144 and the second guide pole 145.

A CCD attachment plate 146 is also fixed to the master flange 109. The CCD image sensor 110 is sandwiched between the master flange 109 and the CCD attachment plate 146. Light that has passed through an opening 147 in the master flange 109 arrives the light receiving face of the CCD image sensor 110.

A depression 109A is formed in the front face of the master flange 109 in order to prevent the cam follower 119A of the cam frame 103 from interfering with the master flange 109. In the stowed state of the lens barrel 100, the cam follower 119A of the cam frame 103 goes into the depression 109A.

This prevents the lens barrel 100 from becoming larger in the optical axis direction even though the cam follower 119A is disposed more to the rear than the cam followers 119B and 119C.

<Operation of Lens Barrel>

Next, the operation of the lens barrel 100 will be described.

When a power switch 10 is turned on, the lens barrel 100 is driven from its stowed state (FIGS. 8A and 8B) to the initial imaging state (FIGS. 9A and 9B). More specifically, when the drive gear 114 is rotationally driven by the zoom motor unit 116, the cam frame 103 rotates in an R1 direction with respect to the fixed frame 107 via the gear portion 120. In this embodiment, the initial imaging state corresponds to a state in which the lens barrel 100 is located at the wide angle end.

When the lens barrel 100 is in its stowed state, the drive gear 114 meshes with the first end 120A of the gear portion 120 (see FIG. 11). When the drive gear 114 is rotationally driven by the zoom motor unit 116 in the stowed state of the lens barrel 100, the position at which the drive gear 114 meshes with the gear portion 120 changes from the first end 120A toward the second end 120B (see FIG. 11).

When the cam frame 103 rotates in the R1 direction (see FIG. 4) with respect to the fixed frame 107, as shown in FIGS. 8 and 9, the cam followers of the cam frame 103 (119A to 119C in FIG. 12) are guided by the first cam grooves 112 of the fixed frame 107 (112A to 112C in FIG. 7). First, the cam frame 103 rotates by a specific amount without being deployed with respect to the fixed frame 107. Then, the cam frame 103 begins to be deployed forward from the fixed frame 107 while rotating. At this point, the first end 120A of the gear portion 120 is disposed on the front side of the cam follower 119A (see FIG. 11). However, immediately after the start of drive from the stowed state, the cam frame 103 rotates without being deployed with respect to the fixed frame 107, so the drive gear 114 does not interfere with the cam follower 119A.

Meanwhile, as shown in FIGS. 8 to 10, the third bayonet couplers 129 of the first rectilinear frame 102 engage with the first bayonet couplers 121 of the cam frame 103. Accordingly, when the cam frame 103 is deployed in the optical axis direction while rotating with respect to the fixed frame 107, the first rectilinear frame 102 moves integrally with the cam frame 103 in the optical axis direction. At this point, the rectilinear guide projections 127 of the first rectilinear frame 102 are guided in the optical axis direction by the rectilinear guide grooves 113 of the fixed frame 107, so the first rectilinear frame 102 does not rotate with respect to the fixed frame 107.

When the cam frame 103 rotates in the R1 direction (see FIG. 4) with respect to the fixed frame 107, as shown in FIG. 9A, the front cam pins 122A moves through the front cam grooves 138A of the first lens frame 101. Also, as shown in FIGS. 8, 9A, 10A, and 14 to 16, the rear cam pins 122B move through the rear cam grooves 138B of the first lens frame 101.

At this point, as shown in FIG. 9, the first guide protrusions 136A and the second guide protrusions 136B of the first lens frame 101 (see FIG. 20) are guided in the optical axis direction by the rectilinear guide grooves 128 of the first rectilinear frame 102. Specifically, the rotation of the first lens frame 101 with respect to the fixed frame 107 is restricted by the first rectilinear frame 102.

Therefore, when the cam frame 103 rotates in the R1 direction with respect to the fixed frame 107 (see FIG. 4), the first lens frame 101 moves in the optical axis direction with respect to the cam frame 103, according to the shape of the front cam grooves 138A and the rear cam grooves 138B, without rotating with respect to the first rectilinear frame 102 or the fixed frame 107. Thus, when the cam frame 103 and the first lens frame 101 rotate relatively, the movement path 137T of the reinforcing portions 137, the movement path 122AT of the front cam pins 122A, and the movement path 122BT of the rear cam pins 122B are as shown in FIGS. 14 to 16.

Furthermore, as shown in FIGS. 9B and 17 to 19, the first rotary guide 162 and second rotary guide 163 of the second rectilinear frame 104 engage with the second bayonet couplers 126 of the cam frame 103. Accordingly, when the cam frame 103 is deployed in the optical axis direction while rotating with respect to the fixed frame 107, the second rectilinear frame 104 moves integrally with the cam frame 103 in the optical axis direction. At this point the projections 132 of the second rectilinear frame 104 are guided in the optical axis direction by the rectilinear guide grooves 113 of the fixed frame 107. Specifically, the second rectilinear frame 104 does not rotate with respect to the fixed frame 107.

As shown in FIG. 9B, the first guide plate 131A (see FIG. 5) and second guide plate 131B of the second rectilinear frame 104 are inserted into the rectilinear guide grooves 140 of the shutter unit 106. Consequently, the shutter unit 106 moves in the optical axis direction without rotating with respect to the fixed frame 107.

As shown in FIGS. 8A to 10A, the front cam pins 139A and rear cam pins 139B of the shutter unit 106 are inserted into the front cam grooves 125A and rear cam grooves 125B of the cam frame 103.

Specifically, the shutter unit 106 is supported by the cam frame 103 via the cam mechanism M2 (the front cam grooves 125A and the rear cam grooves 125B). Therefore, when the cam frame 103 rotates with respect to the fixed frame 107, the shutter unit 106 moves in the optical axis direction with respect to the cam frame 103 according to the shape of the front cam grooves 125A and the rear cam grooves 125B.

The third lens frame 108 is driven in the optical axis direction with respect to the master flange 109 by the focus motor unit 148.

Drive by the zoom motor unit 116 stops when the rotational angle of the cam frame 103 with respect to the fixed frame 107 reaches a specific angle. Then, the lens barrel 100 stops in the initial imaging state shown in FIGS. 9A and 9B.

<Features of Lens Barrel>

Features of the lens barrel 100 described above are compiled below.

(1-1)

As shown in FIG. 7, the fixed frame 107 (first frame) has the first cam grooves 112A to 112C. As discussed above, the drive gear 114 is disposed rotatably with respect to the fixed frame 107. As shown in FIG. 12, the drive gear 114 is disposed rotatably with respect to the fixed frame 107. As shown in FIG. 12, the cam frame 103 (second frame) has the plurality of cam followers 119A to 119C and the gear portion 120 that meshes with the drive gear 114. The cam follower 119A is inserted into the first cam groove 112A. The cam follower 119B is inserted into the first cam groove 112B. The cam follower 119C is inserted into the first cam groove 112C. Consequently, the cam frame 103 is deployed forward (to the subject side) from the fixed frame 107 while being rotated by the rotation of the drive gear 114. The cam follower 119A is disposed to the rear of the first end 120A of the gear portion 120 (on the image plane side, using the gear portion 120 as a reference).

Thus, with this lens barrel 100, since the cam follower 119A is disposed to the rear of the gear portion 120 of the cam frame 103, the gear portion 120 can be lengthened in the peripheral direction without increasing the peripheral direction spacing of the cam followers 119. Therefore, when the drive gear 114 is used to rotationally drive the cam frame 103 with respect to the fixed frame 107, the relative rotational angles of the fixed frame 107 and the cam frame 103 can be increased without sacrificing the support accuracy of the cam frame 103 with respect to the fixed frame 107.

Also, this increase in the relative rotational angle affords much more movement of the cam frame 103 with respect to the fixed frame 107 when the cam frame 103 is deployed forward from the fixed frame 107 using the cam followers 119A to 119C and the first cam grooves 112A to 112C. That is, with this lens barrel 100, a higher zoom ratio can be achieved without making the product bulkier.

(1-2)

As shown in FIG. 11, the cam follower 119A of the cam frame 103 is offset to the rear (the image plane side) with respect to the cam follower 119B and the cam follower 119A. Therefore, the shape of the gear portion 120 can be substantially straight along the peripheral direction of the cam frame 103.

(1-3)

As shown in FIGS. 11 to 13, the length of the cam follower 119A in the peripheral direction is greater than the length of the cam follower 119A in the optical axis direction, and this increases the strength of the cam follower 119A. Also, the length of the cam follower 119B in the peripheral direction is greater than the length of the cam follower 119B in the optical axis direction, and the length of the cam follower 119C in the peripheral direction is greater than the length of the cam follower 119C in the optical axis direction. Therefore, the strength of the cam followers 119B and 119C can also be increased.

If the length of the cam followers 119A to 119C is extended in the peripheral direction, there will be less space between the cam followers 119A to 119C. Therefore, if the gear portion 120 is disposed between the cam followers 119A and 119B, it will be difficult to ensure adequate length of the gear portion 120.

However, with the lens barrel 100, since the cam follower 119A is disposed to the rear of the first end 120A of the gear portion 120, sufficient length of the gear portion 120 can be ensured in the peripheral direction even though the cam followers 119A to 119C are formed in a long, slender shape in the peripheral direction.

Specifically, employing the above-mentioned configuration allows the impact resistance of the lens barrel 100 to be increased and the zoom ratio to be raised.

(1-4)

As shown in FIG. 14, the length E1 of the first end 120A of the gear portion 120 in the optical axis direction is less than the maximum length E2 of the gear portion 120 in the optical axis direction. Consequently, even though the cam follower 119A is disposed to the rear of the first end 120A of the gear portion 120, this helps prevent the lens barrel 100 from becoming bulkier in the optical axis direction.

(1-5)

As shown in FIGS. 11 to 13, the cam follower 119A is in contact with the gear portion 120. More specifically, the cam follower 119A is integral with the first end 120A of the gear portion 120, and there is no gap between the first end 120A and the cam follower 119A. Consequently, the cam follower 119A and the gear portion 120 can increase each other's strength, and damage to both can be effectively prevented.

(2-1)

As shown in FIGS. 11 to 13, the stowage space S is formed between the cam frame main body 117 and the first bayonet couplers 121. Accordingly, when the first lens frame 101 moves in the optical axis direction with respect to the cam frame 103, the entire end of the first lens frame 101 (all the way around) can fit in the stowage space S (see FIG. 8A, for example). Accordingly, the combined length of the cam frame 103 and the first lens frame 101 in the optical axis direction can be shorter, and the lens barrel 100 can be made more compact in the optical axis direction.

(2-2)

When the combined length of the cam frame 103 and the first rectilinear frame 102 in the optical axis direction is shortest (that is, in the stowed state of the lens barrel 100), the entire end of the first lens frame 101 (all the way around) can fit in the stowage space S. This affords a further reduction in the combined length of the first lens frame 101 and the cam frame 103 in the optical axis direction, and allows the lens barrel 100 to be made even more compact in the optical axis direction.

(2-3)

As shown in FIGS. 11 to 13, the first bayonet couplers 121 of the cam frame 103 protrude integrally in the optical axis direction from the flange 118 on the outside in the radial direction and near the through-holes 121C of the cam frame 103. Accordingly, the first bayonet couplers 121 increase the strength of the flange 118, and increase the overall strength of the cam frame 103.

(2-4)

As shown in FIGS. 11 to 13, the flange 118 has the through-holes 121C disposed on the inner peripheral side of the first bayonet couplers 121. In the stowed state of the lens barrel 100 shown in FIG. 8A, the protrusions 101C of the first lens frame 101 are inserted into the through-holes 121C. This allows the first lens frame 101 and the cam frame 103 to be shorter in length in the optical axis direction, and allows the lens barrel 100 to be more compact in the optical axis direction.

(3-1)

As shown in FIGS. 8A, 8B, and 11, the flange 118 of the cam frame 103 has the recesses 150. When the first lens frame 101 is at its closest to the flange 118, the first guide protrusions 136A of the first lens frame 101 go into the recesses 150. Accordingly, the dimensions of the entire lens barrel 100 can be reduced when the first lens frame 101 is at its closest to the flange 118. Therefore, a more compact size in the optical axis direction can be achieved with this lens barrel 100.

(3-2)

As shown in FIG. 21, with the first lens frame 101, the length of the distal ends of the first guide protrusions 136A in the optical axis direction is greater than the length of the bases of the first guide protrusions 136A in the optical axis direction. Consequently, even if the rectilinear guide grooves 128 of the first rectilinear frame 102 are interrupted midway by the rotary grooves 1757 of the first rectilinear frame 102, since the length of the distal ends of the first guide protrusions 136A in the optical axis direction is greater than the width of the rotary grooves 175 of the first rectilinear frame 102, the distal ends of the first guide protrusions 136A can be moved stably within the rectilinear guide grooves 128. Therefore, even though a combination of cam grooves, rotary grooves, and so forth is provided to the rectilinear guide grooves 128, the first guide protrusions 136A can still be guided stably in the rectilinear guide grooves 128. Specifically, this increases latitude in the design of the first rectilinear frame 102.

(3-3)

As shown in FIG. 21, the length of the first guide protrusions 136A in the optical axis direction gradually increases outward in the radial direction of the main body portion 101A. The distal ends of the first guide protrusions 136A protrude in the direction of the flange 118 of the cam frame 103, using the bases of the first guide protrusions 136A as a reference.

If we take into account an overall reduction in the size of the lens barrel 100 in the optical axis direction, it is preferable for the position of the first guide protrusions 136A to be farther away from the subject. This is because the closer the first guide protrusions 136A is disposed on the subject side, the less the first lens frame 101 can be deployed with respect to the first rectilinear frame 102.

With this lens barrel 100, since the distal ends of the first guide protrusions 136A protrude more toward the flange 118 than the bases do, the first guide protrusions 136A can be entirely disposed at positions farther away from the subject. Also, when the first guide protrusions 136A have moved closer to the flange 118, they will fit in the recesses 150 of the cam frame 103. Therefore, the lens barrel 100 can be made even more compact.

(3-4)

As shown in FIG. 11, since the recesses 150 of the cam frame 103 are portions recessed in the optical axis direction, the flange 118 will be stronger than when through-holes are provided to the flange 118. Therefore, the lens barrel 100 will also be stronger. If there are no particular concerns about strength, then the recesses 150 may be through-holes (holes) instead. If the recesses 150 are through-holes, the first guide protrusions 136A can be designed to be larger in the optical axis direction. Therefore, this affords greater latitude in the design of the lens barrel 100.

(4-1)

As shown in FIG. 17, with this lens barrel 100, the area around the base of the first guide plate 131A of the second rectilinear frame 104 is reinforced by the first rotary guide 162. More specifically, as shown in FIGS. 18 and 19A, the first region B1 of the first guide plate 131A is disposed on the inside of the second region B11 of the first rotary guide 162. The first rotary guide 162 protrudes on both sides of the annular portion 130 in the peripheral direction past the first guide plate 131A.

In this case, since the first rotary guide 162 functions as a rib, the strength around the base of the first guide plate 131A is increased by the first rotary guide 162.

Furthermore, in a state in which the first rotary guide 162 is inserted into the rotary guide grooves 166 of the second bayonet couplers 126 of the cam frame 103, the first rotary guide 162 is reinforced by the cam frame 103. Consequently, the strength around the base of the first guide plate 131A is increased not only by the first rotary guide 162, but also by the cam frame 103.

Therefore, when the shutter unit 106 is guided by the cam frame 103 in the optical axis direction, for example, the area around the base of the first guide plate 131A will be less likely to be damaged if a force in the peripheral direction should be exerted on the first guide plate 131A.

Similarly, the area around the base of the second guide plate 131B of the second rectilinear frame 104 is reinforced by the second rotary guide 163. More specifically, as shown in FIGS. 18 and 19B, the first region B2 of the second guide plate 131B is disposed on the inside of the second region B12 of the second rotary guide 163. The second rotary guide 163 protrudes on both sides of the annular portion 130 in the peripheral direction past the second guide plate 131B.

In this case, since the second rotary guide 163 functions as a rib, the strength of the area around the base of the second guide plate 131B is increased by the second rotary guide 163.

Furthermore, in a state in which the second rotary guide 163 (see FIG. 17) is inserted into the rotary guide grooves 166 (see FIG. 11) of the second bayonet couplers 126 of the cam frame 103, the second rotary guide 163 is reinforced by the cam frame 103. Consequently, the strength around the base of the second guide plate 131B is increased not only by the second rotary guide 163, but also by the cam frame 103.

Therefore, when the shutter unit 106 is guided by the cam frame 103 in the optical axis direction, for example, the area around the base of the second guide plate 131B will be less likely to be damaged if a force in the peripheral direction should be exerted on the second guide plate 131B.

(4-2)

As shown in FIG. 17, the annular portion 130 has the inner peripheral protrusion 161. This inner peripheral protrusion 161 increases the strength of the annular portion 130. Furthermore, the first rotary guide 162 has the first bayonet 162A an the second bayonet 162B. The first bayonet 162A an the second bayonet 162B protrude outward in the radial direction from the inner peripheral protrusion 161. This increases the strength of the inner peripheral protrusion 161. Employing this configuration further increases the strength of the area around the base of the first guide plate 131A.

(4-3)

As shown in FIGS. 17, 24A, and 24B, with the second rectilinear frame 104, the first bayonet 162A and the second bayonet 162B are disposed aligned in the peripheral direction of the annular portion 130. The slit 162C is formed between the first bayonet 162A and the second bayonet 162B.

As shown in FIGS. 12, 24A, and 24B, the cam frame 103 has the cam frame main body 117 (cylindrical portion), a first portion 167A, a second portion 167B, and an intermediate portion 167C. The first portion 167A and the second portion 167B protrude inward from the inner peripheral face of the cam frame main body 117, and form the rotary guide grooves 166. The intermediate portion 167C protrudes inward from the inner peripheral face of the cam frame main body 117 and is disposed between the first portion 167A and the second portion 167B in the peripheral direction. A first gap 167D is formed between the first portion 167A and the intermediate portion 167C. The first gap 167D serves to lead the first bayonet 162A into the rotary guide grooves 166. A second gap 167E is formed between the second portion 167B and the intermediate portion 167C. The second gap 167E serves to lead the second bayonet 162B into the rotary guide grooves 166. The length of the intermediate portion 167C in the peripheral direction is less than the length of the slit 162C in the peripheral direction.

As shown in FIGS. 24A and 24B, the first bayonet 162A and the second bayonet 162B are guided into the rotary guide grooves 166 via the first gap 167D and the second gap 167E. At this point the slit 162C passes through the intermediate portion 167C. When the first bayonet 162A and the second bayonet 162B reach the rotary guide grooves 166, the second rectilinear frame 104 is threaded to the cam frame 103. The first bayonet 162A and the second bayonet 162B then move in the peripheral direction through the rotary guide grooves 166. Consequently, the first bayonet 162A hooks the first portion 167A, and the second bayonet 162B hooks the intermediate portion 167C. Specifically, force exerted in the optical axis direction on the second rectilinear frame 104 and the cam frame 103 can be borne at two places on either side of the first guide plate 131A, and the first guide plate 131A is less apt to deform under force exerted in the peripheral direction. Also, the first bayonet 162A hooks the intermediate portion 167C. The same applies when the second bayonet 162B hooks the second portion 167B. The second rotary guide 163 side has the same configuration as the first rotary guide 162 side, and the same effect is obtained.

Thus, with this lens barrel 100, the linking strength of the second rectilinear frame 104 and the cam frame 103 can be increased.

(4-4)

As shown in FIGS. 17 and 18, since the first guide plate 131A protrudes in the optical axis direction from the inside of the inner peripheral protrusion 161, the strength around the base of the first guide plate 131A can be further increased by the inner peripheral protrusion 161.

(5-1)

As shown in FIGS. 14 to 16, when the first lens frame 101 and the cam frame 103 rotate relatively, for example, after the front cam pins 122A have been guided by the front cam grooves 138A, the rear cam pins 122B are guided by the rear cam grooves 138B, instead of the front cam pins 122A and the front cam grooves 138A. Therefore, compared to when just the front cam pins 122A and the front cam grooves 138A are provided, the relative movement distance in the optical axis direction between the first lens frame 101 and the cam frame 103 can be extended without increasing the length of the first lens frame 101 and the cam frame 103 in the optical axis direction. Therefore, the lens barrel 100 can be made more compact while its zoom ratio is also raised. The front cam pins 122A is disposed in front of the rear cam pins 122B. The positions of the front cam pins 122A and the rear cam pins 122B in the peripheral direction are the same. As a result, the shape of the outer periphery of the cam frame 103 can be simplified, making it easier to product a mold for cam pin-shaped parts in injection molding.

(6-1)

With this lens barrel 100, when the first lens frame 101 is guided in the optical axis direction by the cam frame 103, as shown in FIGS. 22A and 23A, part of the fixing portions 172 of the barrier unit 134 and the first lens frame 101 go into the cut-out spaces V formed in the cam frame 103. Therefore, even if the first lens frame 101 and the cam frame 103 are close together, interference can be prevented between the cam frame 103 and the fixing portions 172 of the barrier unit 134 and the first lens frame 101.

(6-2)

As shown in FIG. 21, the barrier unit 134 can be easily mounted to the first lens frame 101 by hooking the mounting portions 134A of the barrier case 173 to the projections 101B.

Consequently, the structure for attaching the barrier unit 134 to the first lens frame 101 can be simplified. Also, compared to when the barrier unit 134 is attached to the first lens frame 101 with screws or the like, the dimensions of the fixing portions 172 can be smaller. Therefore, a more compact lens barrel 100 can be obtained.

Other Embodiments (A) In the above embodiment, the cam frame 103 was disposed on the inside of the first lens frame 101, but the cam frame 103 may be disposed on the outside of the first lens frame 101.

(B) In the above embodiment, the cam followers 122, which were examples of cam followers, and the reinforcing portions 137 were substantially cylindrical in shape, but the cam followers may be elliptical or have some other shape. The cam followers may be integrally molded from resin, or may be constituted by a member of metal or the like. The cam followers may also be constituted by shafts and rollers.

(C) In the above embodiment, the second cam grooves 138 of the first lens frame 101 need not be through-grooves, and may have a bottom. However, the second cam grooves 138 may be through-grooves. Having a bottom, though, is preferable because it affords strength for holding the lenses.

(D) In the above embodiment, fourth cam grooves 125 are formed in the inner peripheral face of the cam frame main body 117. This is preferable because the cam frame 103 can be made thinner by not forming the auxiliary grooves 123 in the portion where the fourth cam grooves 125 are formed.

<Features of Embodiments>

The features of the above embodiment are listed below. The inventions encompassed by the above embodiment are not limited to what follows. The parts given in parentheses after the various components and/or portions are specific examples given to aid in an understanding of the features. The various components and/or portions are not limited to these specific examples. Also, component and/or portion other than the described features may be modified or eliminated in order to obtain the effects stated for the various features.

(1-1) The lens barrel pertaining to the first feature comprises a first frame (fixed frame 107) and a second frame (cam frame 103). The first frame has a plurality of cam grooves (first cam grooves 112A to 112C). The second frame has a plurality of cam followers (cam followers 119A to 119C) and a gear portion (gear portion 120). The plurality of cam followers are respectively inserted into the plurality of cam grooves. The gear portion transmits rotational force. The second frame transmits the rotational force to the gear portion, and thereby moves in the optical axis direction while rotating with respect to the first frame. At least one of the plurality of cam followers is disposed on the image plane side of the gear portion.

With this lens barrel, since at least one of the plurality of cam followers is disposed on the image plane side of the gear portion of the second frame, the gear portion can be made longer in the peripheral direction without increasing the spacing between the cam followers 119 in the peripheral direction. Therefore, when the second frame is rotationally driven with respect to the first frame by the gear portion, large relative rotational angles between the first frame and second frame can be ensured without sacrificing support accuracy of the cam frame 103 with respect to the fixed frame 107. Thus increasing the relative rotational angles between the first frame and second frame allows the amount of movement of the second frame with respect to the first frame to be increased. That is, a higher zoom ratio can be achieved with this lens barrel.

(1-2) The lens barrel pertaining to the second feature is the lens barrel pertaining to the first feature, wherein the plurality of cam followers have a first cam follower, a second cam follower, and a third cam follower. The first cam follower is disposed on the image plane side of the gear portion. Also, the first cam follower is disposed offset to the image plane side with respect to the second and third cam followers. Therefore, the shape of the gear portion can be one that is straight along the peripheral direction of the second frame.

(1-3) The lens barrel pertaining to the third feature is the lens barrel pertaining to the second feature, wherein when the first frame and the second frame rotate relatively, the first to third cam grooves guide the first to third cam followers respectively. As a result, the second frame moves in the optical axis direction while rotating with respect to the first frame. With this lens barrel, since the length of the first cam follower in the peripheral direction of the second frame is greater than the length of the first cam follower in the optical axis direction, the strength of the first cam follower can be increased.

Meanwhile, if the length of the first cam follower is increased in the peripheral direction, the space between the first cam follower and the second cam follower will be narrower, for example. Accordingly, it will be difficult to extend the length of the gear portion if the gear portion is disposed between the first cam follower and the second cam follower.

However, with this lens barrel, the first cam follower is disposed to the rear of the first end (the first end 120A) of the gear portion. Accordingly, even though the length of the first cam follower is extended in the peripheral direction, the length of the gear portion can also be extended in the peripheral direction. Therefore, employing the above-mentioned configuration allows the impact resistance of the lens barrel to be improved while also raising the zoom ratio.

(1-4) The lens barrel pertaining to the fourth feature is the lens barrel pertaining to the second or third feature, wherein in a state in which the combined length of the first frame and the second frame is shortest, the first end of the gear portion meshes with a drive gear. The first cam follower is disposed on the image plane side of the first end of the gear portion.

(1-5) The lens barrel pertaining to the fifth feature is the lens barrel pertaining to the fourth feature, wherein the gear portion has a second end (second end 120B) disposed on the opposite side from the first end. The position of the second cam follower in the optical axis direction is substantially the same as the position of the second end in the optical axis direction.

(1-6) The lens barrel pertaining to the sixth feature is the lens barrel pertaining to the fourth or fifth feature, wherein the length of the first end in the optical axis direction is less than the maximum length of the gear portion in the optical axis direction. This helps prevent the lens barrel from becoming larger in the optical axis direction even though the cam followers are disposed on the image plane side of the gear portion.

(1-7) The lens barrel pertaining to the third feature is the lens barrel pertaining to any of the second to sixth features, wherein the first cam follower is in contact with the gear portion. More specifically, the cam follower 119A is integral with the first end 120A of the gear portion 120.

Consequently, the cam followers and the gear portion increase each other's strength, and damage to both can be effectively prevented.

(1-8) The lens barrel pertaining to the eighth feature is the lens barrel pertaining to the seventh feature, wherein a gap is formed between the second cam follower and the gear portion.

(2-1) The lens barrel pertaining to a ninth embodiment comprises a moving frame (first lens frame 101), a drive frame (cam frame 103), and a rectilinear guide frame (first rectilinear frame 102).

The moving frame has a substantially cylindrical moving frame main body (included in the first lens frame 101), rectilinear projections (first guide protrusions 136A), a first cam mechanism (second cam grooves 138), and protrusions (protrusions 101C). The rectilinear projections protrude outward in the radial direction from the moving frame main body. The first cam mechanism is provided to the inner peripheral face of the moving frame main body. The protrusions protrude to the image plane side in the optical axis direction from the end of the moving frame main body.

The drive frame has a substantially cylindrical drive frame main body (cam frame main body 117) and a second cam mechanism (cam followers 122). The second cam mechanism is provided to the outer peripheral face of the drive frame main body and constitutes a cam mechanism (second cam grooves 138, cam followers 122) along with the first cam mechanism. This drive frame uses a cam mechanism to guide the moving frame in the optical axis direction. The rectilinear guide frame has rectilinear grooves (rectilinear guide grooves 128) that engage with the rectilinear projections. The rectilinear guide frame supports the moving frame relatively rotatably and relatively movably in the optical axis direction.

The drive frame has rotary guide portions (first bayonet couplers 121). The rotary guide portions support the rectilinear guide frame so that it can rotate relatively with respect to the drive frame main body and does not move relatively in the optical axis direction. The rotary guide portions are disposed more to the outer peripheral side than the moving frame and on the outer peripheral side of the drive frame main body.

Also, the drive frame has a flange (flange 118) that protrudes outward in the radial direction from the drive frame main body. The flange has first insertion portions (recesses 150) and second insertion portions (through-holes 121C). The first insertion portions form a space into which at least part of the rectilinear protrusion enters. The second insertion portions form a space into which at least part of the rectilinear protrusion enters.

With this drive frame, a space into which at least part of the protrusions enters is formed. Also, a space into which at least part of the rectilinear projections enters is formed. Accordingly, part of the moving frame can be inserted into the holding space when the moving frame is guided by the drive frame in the optical axis direction. Specifically, the shortest combined length of the moving frame and the drive frame in the optical axis direction can be reduced, allowing for a more compact lens barrel.

(2-2) The lens barrel pertaining to a tenth feature is the lens barrel pertaining to the ninth feature, wherein the drive frame further has a flange (flange 118) that protrudes outward in the radial direction from the drive frame main body. The flange has recesses that are recessed in the optical axis direction. The recesses are first insertion portions. A rotary guide portion protrudes integrally in the optical axis direction from the flange.

(2-3) The lens barrel pertaining to an eleventh feature is the lens barrel pertaining to the tenth feature, wherein the flange has through-holes (through-holes 121C) disposed on the inner peripheral side of the rotary guide portions. The through-holes 121C are disposed on the inner peripheral face of the first bayonet couplers 121. The through-holes 121C are second insertion portions. At least part of the protrusions can be inserted into the through-holes in the optical axis direction.

(2-4) The lens barrel pertaining to a twelfth feature is the lens barrel pertaining to the ninth or tenth feature, wherein the rectilinear guide frame has rotary grooves (rotary grooves 175) that extend in the peripheral direction. The rotary guide portions have base portions (base plates 121B) and guide protrusions (bayonets 121A). The base portions extend along the peripheral direction of the cam mechanism, and protrude in the optical axis direction from the flange. The guide protrusions protrude outward from the base portions in the radial direction of the cam frame main body, and are inserted into rotary grooves.

(3-1) The lens barrel pertaining to a thirteenth feature comprises a moving frame (first lens frame 101), a drive frame (cam frame 103), and a rectilinear guide frame (first rectilinear frame 102). The moving frame has flange protrusions (first guide protrusions 136A). The drive frame uses a cam mechanism (cam mechanism M1) to guide the moving frame in the optical axis direction. The rectilinear guide frame has rectilinear grooves (rectilinear guide grooves 128) that are engaged with the rectilinear projections. The rectilinear guide frame supports the moving frame so that it is able to move relatively in the optical axis direction, but does not rotate relatively. The drive frame has a cam mechanism (cam frame main body 117) and a flange (flange 118). The cam mechanism part (cam frame main body 117) constitutes a cam mechanism. The flange (flange 118) protrudes outward in the radial direction from the cam mechanism part. The flange has recesses (recesses 150) which the rectilinear projections enter.

With this lens barrel, since the flange has recesses which the rectilinear projections enter, the shortest combined length of the moving frame and the drive frame in the optical axis direction can be reduced. Therefore, the lens barrel can be made more compact.

(3-2) The lens barrel pertaining to a fourteenth feature is the lens barrel pertaining to the thirteenth feature, wherein the recesses are a portion that is recessed in the optical axis direction.

(3-3) The lens barrel pertaining to a fifteenth feature is the lens barrel pertaining to the thirteenth or fourteenth feature, wherein the moving frame further has a substantially cylindrical moving frame main body (main body portion 101A). The rectilinear projections protrude outward from the moving frame main body in the radial direction of the moving frame main body. The length of the distal ends of the rectilinear projections in the optical axis direction is greater than the length of the bases of the rectilinear projections i the optical axis direction. Consequently, even if the rectilinear grooves are interrupted midway, the distal ends of the rectilinear projections can be moved stably within the rectilinear grooves. Therefore, this affords greater latitude in the design of the rectilinear guide frame.

(3-4) The lens barrel pertaining to a sixteenth feature is the lens barrel pertaining to the fifteenth feature, wherein the length of the rectilinear projections in the optical axis direction gradually increases toward the outside in the radial direction of the moving frame main body.

(3-5) The lens barrel pertaining to a seventeenth feature is the lens barrel pertaining to any of the thirteenth to sixteenth features, wherein the distal ends of the rectilinear projections protrude more toward the flange side than do the bases of the rectilinear projections.

When making the overall lens barrel more compact in the optical axis direction is taken into account, it is preferable for the positions of the rectilinear projections to be on the opposite side from the subject. This is because the more the rectilinear projections are disposed on the subject side, the smaller will be the amount of deployment of the moving frame with respect to the rectilinear guide frame.

Meanwhile, with this lens barrel, since the distal ends of the rectilinear projections protrude more toward the flange than do the bases, the entire rectilinear projections can be disposed at positions far away from the subject. Furthermore, even though the distal ends of the rectilinear projections protrude more toward the flange than do the bases, when the rectilinear projections have moved closer to the flange, they can fit into the recesses. Therefore, the amount in which the moving frame is deployed with respect to the rectilinear guide frame can be increased, while the size of the lens barrel can be further reduced.

(3-6) The lens barrel pertaining to an eighteenth feature is the lens barrel pertaining to any of the thirteenth to sixteenth features, wherein the recesses are through-holes into which the rectilinear projections can be inserted. When the recesses are through-holes, this helps prevent the lens barrel from becoming larger even though the rectilinear projections are made larger in the optical axis direction.

(4-1) The lens barrel pertaining to a nineteenth feature comprises a first frame (shutter unit 106), a second frame (cam frame 103), and a third frame (second rectilinear frame 104). The first frame has rectilinear guide grooves (rectilinear guide grooves 140). The second frame uses a cam mechanism (cam mechanism M2) to guide the first frame in the optical axis direction. The second frame has rotary guide grooves (rotary guide grooves 166) that extend in the peripheral direction. The third frame has an annular portion (annular portion 130), rectilinear guide portions (first guide plate 131A, second guide plate 131B), and bayonet portions (first rotary guide 162, second rotary guide 163). The rectilinear guide portions are provided to the inner peripheral part of the annular portion and extend in the optical axis direction. The bayonet portions extend in the optical axis direction from the inner peripheral part of the annular portion.

With this lens barrel, the rectilinear guide portions of the third frame engage with the rectilinear guide grooves of the first frame, and this results in the first frame being supported so that it can move relatively in the optical axis direction, but does not rotate relatively. Also, the bayonet portions of the third frame engage with the rotary guide grooves of the second frame, and this results in the second frame being supported so that it can rotate relatively with respect to the third frame and can move relatively in the optical axis direction. The bayonet portions protrude on both sides of the annular portion in the peripheral direction, past the rectilinear guide portions. The bayonet portions are supported by the second frame at two or more places, including both sides of the rectilinear guide portions in the peripheral direction.

With this lens barrel, the bayonet portions are provided to the inner peripheral part of the annular portion, and protrude on both sides in the peripheral direction, past the rectilinear guide portions. Accordingly, the bayonet portions increase the strength of the area around the bases of the rectilinear guide portions. Therefore, even if a force is exerted in the peripheral direction on the rectilinear guide portions, the rectilinear guide portions will tend not to be damaged. Furthermore, the bayonet portions are divided up into a plurality of portions in the peripheral direction by slits. Accordingly, in a state in which the bayonet portions are engaged with the rotary guide grooves of the second frame, the bayonet portions will come into contact with the second frame at more places. If the second frame supports at two or more places including both sides of the rectilinear guide portions in the peripheral direction, then the rectilinear guide portions will be less likely to deform under a force in the peripheral direction. Therefore, the linking strength of the second frame and third frame can be increased. Thus, the overall strength can be increased with this lens barrel.

(4-2) The lens barrel pertaining to a twentieth feature is the lens barrel pertaining to the nineteenth feature, wherein the first regions B1 and B2 occupied by the rectilinear guide portions in the peripheral direction of the annular portion are disposed on the inside of the second regions B 11 and B 12 occupied by the bayonet portions in the peripheral direction of the annular portion.

(4-3) The lens barrel pertaining to a twenty-first feature is the lens barrel pertaining to the nineteenth or twentieth feature, wherein the annular portion has a disk portion (disk portion 165) and a rib portion (inner peripheral protrusion 161). The rib portion protrudes in the optical axis direction from the inner peripheral edge of the disk portion, and extends along the inner peripheral edge of the disk portion.

The bayonet portions have a first bayonet (first bayonet 162A, 163A) and a second bayonet (second bayonet 162B, 163B). The first bayonet protrudes outward from the rib portion in the radial direction of the annular portion. The first bayonet is inserted into the rotary guide grooves. The second bayonet protrudes outward from the rib portion in the radial direction of the annular portion. The second bayonet is inserted into the rotary guide grooves.

With this lens barrel, since the annular portion has a rib portion, and the bayonet portions have the first and second bayonets that protrude outward in the radial direction from the rib portion, it is easy to ensure good strength around the bayonet portions.

(4-4) The lens barrel pertaining to a twenty-second feature is the lens barrel pertaining to the twenty-first feature, wherein the first bayonet and the second bayonet are disposed aligned in the peripheral direction of the annular portion. A slit is formed between the first bayonet and the second bayonet.

(4-5) The lens barrel pertaining to a twenty-third feature is the lens barrel pertaining to the twenty-second feature, wherein the second frame has a cylindrical portion, a first portion, and an intermediate portion. The first portion protrudes inward from the inner peripheral face of the cylindrical portion, and forms the rotary guide grooves. The intermediate portion protrudes inward from the inner peripheral face of the cylindrical portion, and is disposed between the first portion and the second portion in the peripheral direction. A first gap for introducing the first bayonet into the rotary guide grooves is formed between the first portion and the intermediate portion. A second gap for introducing the second bayonet into the rotary guide grooves is formed between the second portion and the intermediate portion. The length of the intermediate portion in the peripheral direction is less than the length of the slit in the peripheral direction.

When the first bayonet and the second bayonet are introduced into the rotary guide grooves via the first gap and the second gap, the intermediate portion passes through the slit. When the first bayonet and the second bayonet reach the rotary guide grooves, the third frame is threaded to the first frame, and the first bayonet and the second bayonet move through the rotary guide grooves in the peripheral direction. Consequently, the first bayonet hooks the first portion, and the second bayonet hooks the intermediate portion. Consequently, any force in the optical axis direction exerted on the first frame and the third frame can be borne at two places. The same applies to when the first bayonet hooks the intermediate portion, and the second bayonet hooks the second portion. Thus, with this lens barrel, the linking strength between the first frame and the third frame can be increased.

(4-6) The lens barrel pertaining to a twenty-sixth feature is the lens barrel pertaining to any of the twenty-first to twenty-third features, wherein the rectilinear guide portions protrude in the optical axis direction from the inside of the rib portion.

Consequently, the rib portion can be used to further raise the strength around the bases of the rectilinear guide portions.

(4-7) The lens barrel pertaining to a twenty-fifth feature is the lens barrel pertaining to any of the twenty-first to twenty-fourth features, wherein the length of the first bayonet in the peripheral direction is greater than the length of the slit in the peripheral direction. The length of the second bayonet in the peripheral direction is greater than the length of the slit in the peripheral direction.

(5-1) The lens barrel pertaining to a twenty-sixth feature comprises an outer frame (first lens frame 101) and an inner frame (cam frame 103). At least part of the outer frame forms the external appearance seen by the user. The outer frame has at least one lens (first lens group G1) and a lens support (lens support 101D) that supports the lens. The lens support has recesses (101E) that are recessed in the optical axis direction. Holes that go through in the optical axis direction may be used instead of the recesses 101E.

At least part of the inner frame is disposed on the inside of the outer frame. The inner frame uses a cam mechanism (cam mechanism M1) to guide the outer frame in the optical axis direction. The inner frame has first cam followers and second cam followers. The outer frame has first cam grooves that guide the first cam followers, and second cam grooves that guide the second cam followers.

In this case, the lens barrel has a first state, a second state, and a third state during operation in which the outer frame and the inner frame are rotating relatively. In the first state, the first cam followers (front cam pins 122A) are guided by first cam grooves (front cam grooves 138A). In the second state, the first cam followers are guided by the first cam grooves, and the second cam followers (rear cam pins 122B) are guided by second cam grooves (rear cam grooves 138B). In the third state, the second cam followers are guided by the second cam grooves. In the third state, at least part of the first cam followers goes into the spaces formed by the recesses (101E).

With this lens barrel, the lens barrel has a first state, a second state, and a third state during operation in which the outer frame and the inner frame are rotating relatively. Therefore, compared to when only first cam followers and second cam grooves are provided, the relative movement distance of the outer frame and inner frame in the optical axis direction can be extended without increasing the length of the outer frame or inner frame in the optical axis direction. Specifically, with this lens barrel, a higher zoom ratio can be achieved while minimizing an increase in size. The front cam pins 122A are disposed in front of the rear cam pins 122B. The positions of the font cam pins 122A and rear cam pins 122B in the peripheral direction are the same. Thus, the shape of the outer periphery of the cam frame 103 can be simplified, and it is easier to produce a mold for the cam pin-shaped parts in injection molding.

(5-2) The lens barrel pertaining to a twenty-seventh feature comprises an outer frame (first lens frame 101) and an inner frame (cam frame 103). At least part of the outer frame forms the external appearance seen by the user. The outer frame has at least one lens (first lens group G1) and a lens support (lens support 101D) that supports the lens. The lens support has recesses (101E) that are recessed in the optical axis direction. Holes that go through in the optical axis direction may be used instead of the recesses 101E.

At least part of the inner frame is disposed on the inside of the outer frame. The inner frame uses a cam mechanism (cam mechanism M1) to guide the outer frame in the optical axis direction. The inner frame has first cam followers (front cam pins 122A) and second cam followers (rear cam pins 122B). The inner frame has first cam grooves (front cam grooves 138A) that guide the first cam followers, and second cam grooves (rear cam grooves 138B) that guide the second cam followers.

In this case, the cam mechanism has a first state, a second state, and a third state during operation in which the outer frame and the inner frame are rotating relatively. In the first state, the first cam followers are guided by first cam grooves. In the second state, the first cam followers are guided by the first cam grooves, and the second cam followers are guided by second cam grooves. In the third state, the second cam followers are guided by the second cam grooves. In the third state, at least part of the first cam grooves goes into the spaces formed by the recesses (101E).

With this lens barrel, the cam mechanism has a first state, a second state, and a third state during operation in which the outer frame and the inner frame are rotating relatively. Therefore, compared to when only first cam followers and second cam grooves are provided, the relative movement distance of the outer frame and inner frame in the optical axis direction can be extended without increasing the length of the outer frame or inner frame in the optical axis direction. Specifically, with this lens barrel, a higher zoom ratio can be achieved while minimizing an increase in size.

(5-3) The lens barrel pertaining to a twenty-eighth feature comprises an outer frame (first lens frame 101) and an inner frame (cam frame 103). At least part of the outer frame forms the external appearance seen by the user. The outer frame has at least one lens (first lens group G1) and a lens support (lens support 101D) that supports the lens. At least part of the inner frame is disposed on the inside of the outer frame. The inner frame uses a cam mechanism (cam mechanism M1) to guide the outer frame in the optical axis direction.

The outer frame has first cam followers and first cam grooves. The inner frame has second cam grooves that guide the first cam followers, and second cam followers that are guided by the first cam grooves.

In this case, the cam mechanism has a first state, a second state, and a third state during operation in which the outer frame and the inner frame are rotating relatively. In the first state, the first cam followers are guided by the second cam grooves. In the second state, the first cam followers are guided by the second cam grooves, and the second cam followers are guided by first cam grooves. In the third state, the second cam followers are guided by the first cam grooves.

With this lens barrel, the cam mechanism has a first state, a second state, and a third state during operation in which the outer frame and the inner frame are rotating relatively. Therefore, compared to when only first cam followers and second cam grooves are provided, the relative movement distance of the outer frame and inner frame in the optical axis direction can be extended without increasing the length of the outer frame or inner frame in the optical axis direction. Specifically, with this lens barrel, a higher zoom ratio can be achieved while minimizing an increase in size.

(6-1) The lens barrel pertaining to a twenty-ninth feature comprises an first frame (first lens frame 101), a barrier mechanism (barrier unit 134), and a second frame (cam frame 103). The barrier mechanism is fixed to the first frame and blocks off an opening. The second frame uses a cam mechanism (cam mechanism M1) to guide the first frame in the optical axis direction. The second frame has a substantially cylindrical cam mechanism (cam frame main body 117) and a thin-wall part (thin-wall part 182) that is thinner than the cam mechanism. Fixing portions (fixing portions 172) of the barrier mechanism go into the spaces (cut-out spaces V) formed between the thin-wall part and the first frame.

With this lens barrel, the fixing portions of the barrier mechanism go into spaces formed between the thin-wall part and the first frame. Accordingly, even when the first frame and the second frame move close together in the optical axis direction, the fixing portions can be prevented from interfering with the second frame. Consequently, with this lens barrel, the minimum length of the first frame and second frame in the optical axis direction can be shortened, and a more compact size can be obtained.

(6-2) The lens barrel pertaining to a thirtieth feature is the lens barrel pertaining to the twenty-ninth feature, wherein the barrier mechanism has barrier vanes (barrier vanes 135) that block off the opening, a barrier case (barrier case 173) that supports the barrier vanes, and mounting portions (mounting portions 134A). The mounting portions constitute part of the fixing portions, and protrude in the optical axis direction from the barrier case. The first frame has mates to the mounting portions. These mates (projections 101B) constitute part of the fixing portions, and hook the mounting portions. In this case, when the first frame is guided by the second frame in the optical axis direction, at least part of the mounting portions and the mates to the mounting portions goes into spaces (cut-out spaces V) formed between the thin-wall part and the first frame.

Thus, the barrier mechanism can be mounted to the first support frame by hooking the mounting portions to the fixing projections. Consequently, the configuration for attaching the barrier mechanism to the first support frame can be simplified. Also, the size of the fixing portion can be reduced as compared to when the attachment is by screws or the like. Therefore, the lens barrel can be made more compact.

General Interpretation of Terms

In understanding the scope of the present disclosure, the term "comprising" and its derivatives, as used herein, are intended to be open ended terms that specify the presence of the stated features, elements, components, portions, groups, integers, and/or steps, but do not exclude the presence of other unstated features, elements, components, portions, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, portion, section, or part of a device implies the existence of other unclaimed or unmentioned components, portions, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components and/or portions can be changed as needed and/or desired. Components and/or portions that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The technology disclosed herein can be utilized as a lens barrel used in digital cameras, film cameras, portable telephones, projectors, and other such devices having projecting optical systems.

What is claimed is:

1. A lens barrel comprising:
a first frame including an engaged portion;
a barrier mechanism fixed to the first frame and configured to block an opening, the barrier mechanism including:
   a fixing portion,
   a plurality of barrier vanes that block off an opening,
   a barrier case that supports the barrier vanes, and
   a mounting portion that forms part of the fixing portion and protrude in the optical axis direction from the barrier case;
the engaged portion of the first frame forming part of the fixing portion and configured to hook to the mounting portion;
a second frame configured to guide the first frame in the optical axis direction by a cam mechanism, the second frame including a cylindrical cam mechanism part that constitutes a cam mechanism, the cam mechanism including a thin-wall part that is partially thinner in the radial direction;
the fixing portion of the barrier mechanism is configured to go into spaces between the thin-wall part and the first frame; and
when the first frame is guided by the second frame in the optical axis direction, at least part of the mounting portion and the engaged portion are configured to go into spaces formed between the thin-wall part and the first frame.

* * * * *